United States Patent [19]
Takagi et al.

[11] Patent Number: 5,635,928
[45] Date of Patent: Jun. 3, 1997

[54] DATA PROCESSING DEVICE WITH A KEYBOARD HAVING POP-UP KEYS

[75] Inventors: Takeyuki Takagi, Nagoya; Hiroaki Okada, Kasugai; Yoshijiro Yamamoto, Toyokawa; Yukio Suzuki, Kani, all of Japan

[73] Assignee: Brother Kogyo Kabushiki Kaisha, Nagoya, Japan

[21] Appl. No.: 569,943

[22] Filed: Dec. 8, 1995

[30] Foreign Application Priority Data

Dec. 23, 1994 [JP] Japan .................................. 6-336187
Jan. 17, 1995 [JP] Japan .................................. 7-023471

[51] Int. Cl.⁶ ........................ H03K 17/94; H03M 11/00
[52] U.S. Cl. ..................... 341/22; 345/168; 361/680; 400/682
[58] Field of Search ......................... 361/680; 400/682, 400/691; 341/22; 345/168, 169

[56] References Cited

U.S. PATENT DOCUMENTS

| | | | |
|---|---|---|---|
| 5,141,343 | 8/1992 | Roylance et al. | 400/472 |
| 5,268,545 | 12/1993 | Bruner | 200/345 |
| 5,278,372 | 1/1994 | Takagi et al. | 200/344 |
| 5,329,084 | 7/1994 | Watanabe et al. | 200/344 |
| 5,382,762 | 1/1995 | Mochizuki | 200/5 A |
| 5,424,516 | 6/1995 | Emmons | 200/344 |
| 5,463,195 | 10/1995 | Watanabe et al. | 200/5 A |
| 5,466,901 | 11/1995 | Mochizuki | 200/5 A |
| 5,490,037 | 2/1996 | Clancy | 361/680 |
| 5,519,569 | 5/1996 | Sellers | 361/680 |
| 5,532,904 | 7/1996 | Sellers | 400/682 |

FOREIGN PATENT DOCUMENTS

| | | |
|---|---|---|
| 691601 | 1/1996 | European Pat. Off. . |
| 3-10307 | 1/1991 | Japan . |
| 5-19923 | 1/1993 | Japan . |
| 5-80880 | 4/1993 | Japan . |
| 5-298000 | 11/1993 | Japan . |

Primary Examiner—Jeffery Hofsass
Assistant Examiner—Timothy Edwards, Jr.
Attorney, Agent, or Firm—Oliff & Berridge

[57] ABSTRACT

A data processing device including a keyboard with a key; a lid provided to an edge of the keyboard so as to be pivotable from a closed position, to a predetermined angle, and further to an open position; a key support mechanism movable between a first position for supporting the key in an operation condition and a second position wherein the key is not supported; a follower in connection with the key support mechanism so that the follower and the key support move in association; and a driver connected with the lid so as to operate in association with pivotal movement of the lid, the driver driving the follower only when the lid is pivoted between the closed position and the predetermined angle so that the key support mechanism moves from the first position into the second position when the lid is pivoted open between the closed position to the predetermined angle and the key support mechanism remains in the second position when the lid is pivoted open to the predetermined angle or greater.

26 Claims, 16 Drawing Sheets

DATA PROCESSING DEVICE WITH A KEYBOARD HAVING POP-UP KEYS

BACKGROUND OF THE INVENTION

1. Field of the Invention

The present invention relates to a data processing device with a keyboard having pop-up keys.

2. Description of the Related Art

Data processing devices such as laptop computers and word processors have become very popular in recent years because their small size and light weight makes them extremely portable. Many attempts have been made to improve the keyboard of these devices to give them an even slimmer shape.

Japanese Patent Application (KOKAI) No. HEI-5-298000 describes a keyboard device including a flat spring sheet; keys each having a restoration spring and a contact depressing spring formed integrally on the flat spring sheet; and a sliding mechanism having an eccentric cam, a stud, and a suspension spring. The sliding mechanism links the flat spring sheet to an openable lid so that the flat spring sheet slides with opening and closing movements of the lid. When the flat spring sheet is slid by the sliding mechanism, the height of the keys is changed by the restoration spring and the contact depression spring. The spring sheet slides in association with rotation of the eccentric cam and changes the level of the keys accordingly so that an operator can freely change the level of the keys by adjusting the angle to which the lid is opened.

However a drawback of this mechanism is that an operator cannot adjust the lid to a desired angle without also changing the level of the keys. Because a liquid crystal display (LCD) is usually provided to the lid, an operator must be able to adjust the angle of the lid to an angle where he or she can see the display of the LCD. The angular range at which LCDs can be viewed is narrow, for example, narrower than that of cathode ray tubes (CRTs). Also, the viewing angle of LCDs depends on the amount of external light. Because laptop word processors are meant to be portable, they are often used in various places, each with different light conditions. This further increases the requirement that the lid be freely adjustable to any angle.

In this way, the mechanism described in Japanese Patent Application (KOKAI) No. HEI-5-298000 has conflicting problems. When an operator adjusts the angle of the lid to where he or she can see the display of the LCD, the level of the keys will change, possibly to a level where operating the keys is difficult. On the other hand, if the operator adjusts the lid to an angle where the keys are easiest to operate, he or she may not be able to see the screen of the LCD.

SUMMARY OF THE INVENTION

U.S. application Ser. No. 08/495,076 filed on Jun. 27, 1995 describes a laptop computer having: a keyboard with keys; a closable lid with an LCD display; and a mechanism for switching the height of the keys between a high level, or operation condition, and a low level, or non-operation condition. A manually operated knob for locking the keys into either the operation condition or the non-operation condition is provided fixed to a circuit board of the computer. The knob must be operated both before and after the mechanism is operated and so is troublesome. Also, because the knob is manually operated, an operator might forget to operate it.

It is an objective of the present invention to overcome the above-described problems and to provide a data processing device wherein the height of the keys changes in association with pivoting of the lid as long as the lid is pivoted open less than a predetermined angle, but wherein the height of the keys increases no further than an operation level, which is optimum for operating the keys, when the lid is opened to the predetermined angle or greater. An operator can adjust the pivot angle of the lid without changing the height of the keys. Therefore, the keys will always be at the level where their operation is easiest and the lid can be adjusted to a desired angle where the LCD is easiest to view.

In order to achieve the above-described objectives, a data processing device according to one aspect of the present invention comprises: a keyboard with a key; a lid provided to an edge of the keyboard so as to be pivotable from a closed position, to a predetermined angle, and further to an open position; key support mechanism movable between a first position for supporting the key in an operation condition and a second position wherein the key is not supported; follower means in connection with the key support mechanism so that the follower means and the key support mechanism move in association; and drive means connected with the lid so as to operate in association with pivotal movement of the lid, the drive means driving the follower means only when the lid is pivoted between the closed position and the predetermined angle so that the key support mechanism moves from the first position into the second position when the lid is pivoted open between the closed position to the predetermined angle and the key support mechanism remains in the second position when the lid is pivoted open to the predetermined angle or greater.

A keyboard according to another aspect of the invention comprises: a key; a key support mechanism supporting the key in an operation condition when in a first position and in a non-operation condition when in a second position; a sliding member connected to the key support mechanism so that the sliding member and the key support mechanism move in association between the first position and the second position; a holder member formed with an elongated slot of predetermined size a shifting member formed smaller than the elongated slot and disposed in the elongated slot so as to be shiftable in the elongated slot, the shifting member provided in connection with the sliding member so that shifting of the shifting member moves the sliding member between the first position and the second position; and an operation member formed to the shifting member, operation of the operation member shifting the shifting member in the elongated slot.

A data processing device according to a further aspect of the present invention comprises: a keyboard with a key having a key cap; a support shaft provided on one edge of the keyboard; a lid provided with a display and pivotable on the support shaft from a closed position, to a predetermined angle, and further to an open position; a guide support member supporting and guiding vertical movement of the key cap; a holder member to which the guide support member is attached; a circuit board slidably disposed beneath the holder member and formed with a predetermined circuit pattern including a fixed electrode at a position corresponding to the guide support; a switching member disposed on the circuit board at a position in correspondence with the fixed electrode, the switching member movable with sliding movements of the circuit board between a second position wherein the switching member is shifted aside from the guide support member and a first position wherein the switching member supports the guide support member and wherein depressing the key top lowers the switching member to connect a circuit with the fixed electrode; a support member supporting the circuit board; follower means in connection with the circuit board so that the follower means and the circuit board slide in association; drive means connected with the lid so as to operate in association with pivotal movement of the lid, the drive means driving movement of the follower means only while the lid is between the closed position and the predetermined angle, the drive means engaging the follower means while the lid is between the closed position and the predetermined angle so that when the lid is pivoted open from the closed position to the predetermined angle, the circuit board slides over the support member in a predetermined direction, thereby shifting the switching member from the second position to the first position, the drive means and the follower means falling out of engagement when the lid is pivoted open to or greater than the predetermined angle; and an urging means connected with the follower means and for maintaining the switching means in the second position when the lid is pivoted open to or greater than the predetermined angle.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
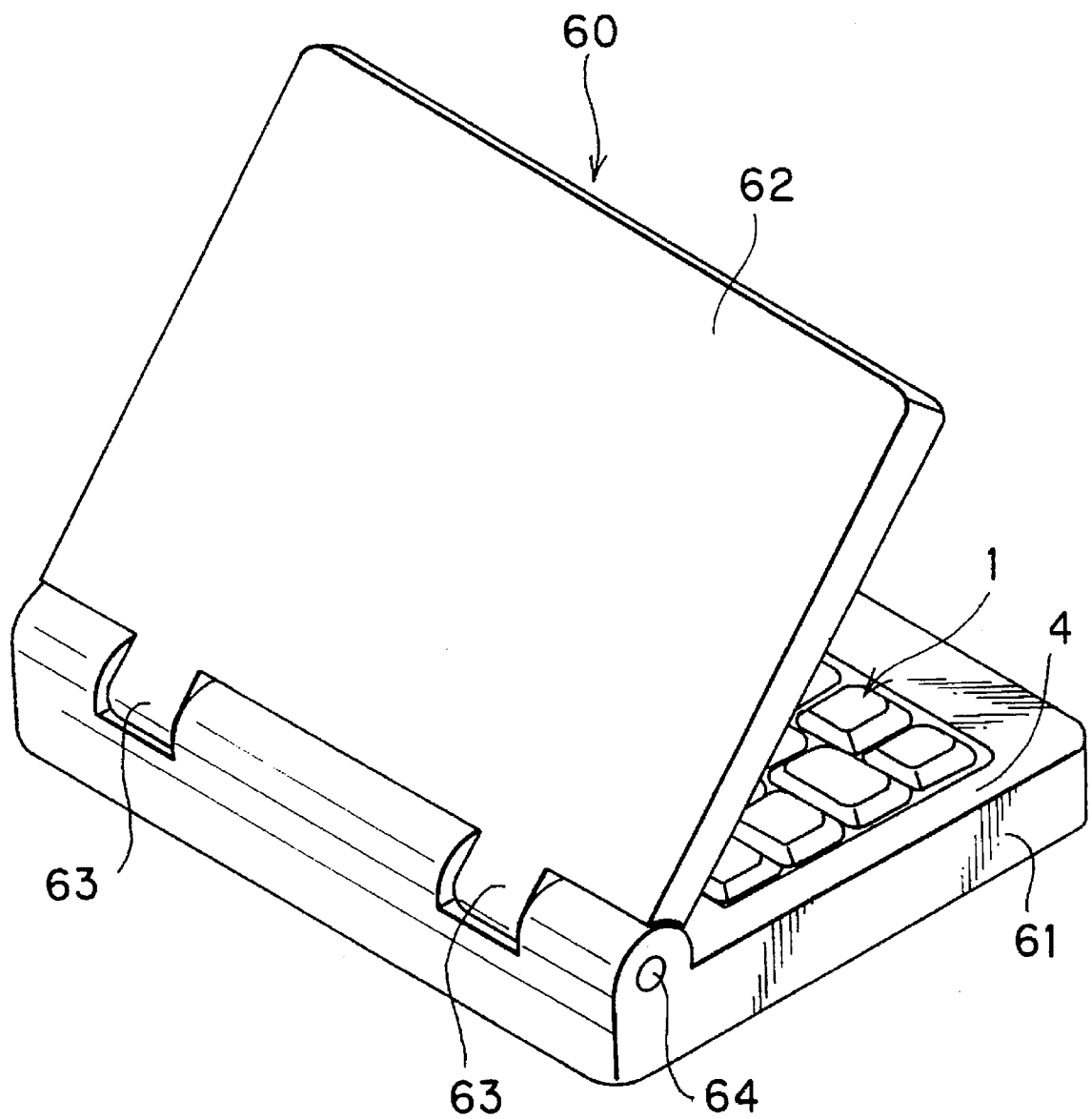
FIG. 1 is a perspective view showing a data processing device including a keyboard according to a first embodiment of the present invention.

A data processing device according to a preferred embodiment of the present invention will be described while referring to the accompanying drawings wherein like parts and components are designated by the same reference numerals to avoid duplicating description.

The present embodiment describes the present invention applied to the keyboard of a laptop word processor 60 shown in perspective in FIG. 1. The word processor 60 includes a keyboard 61 with keys represented by a key 1 in the drawings; and a lid 62 provided with a liquid crystal display (LCD) 34 at its inner surface. Hinges 63 are provided at two places on the lid 62. A shaft 64 is pivotably provided to the keyboard 61 so as to pass through the hinges 63 of the lid 62. The lid 62 is pivotally disposed to the keyboard 61 via hinges 63 and the shaft 64 and can be pivoted open from an closed position to an opened position.

The construction of the keyboard 61 will be described while referring to FIGS. 2 through 5, 8, and 9. The keyboard 61 includes the key 1, a holder plate 4 formed with openings for the keys, a flexible circuit board 6, and a support plate 7. The circuit board 6 is slidably disposed between the holder plate 4 and the support plate 7 and is exposed at openings in the holder plate 4. The support plate 7 is disposed beneath the circuit board 6 and is for supporting the circuit board 6.

Figure 8:
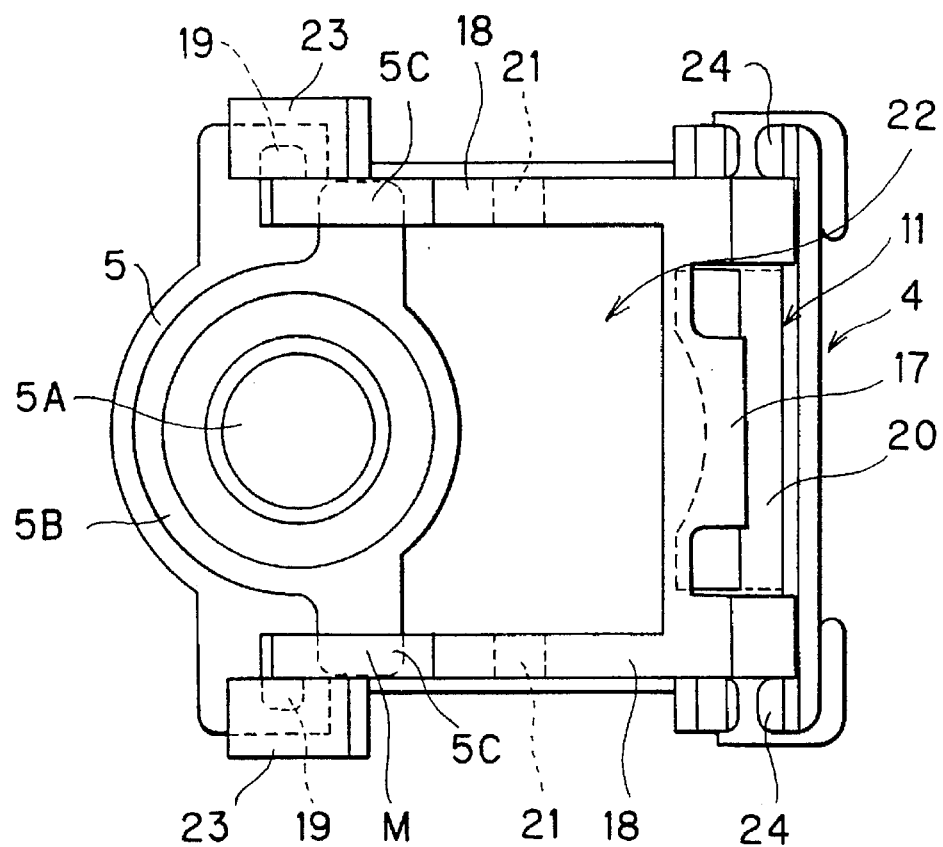
FIG. 8 is a bird's eye view showing a rubber spring and the second linking member of the key when the data processing device is in a non-operation condition.
Figure 9:
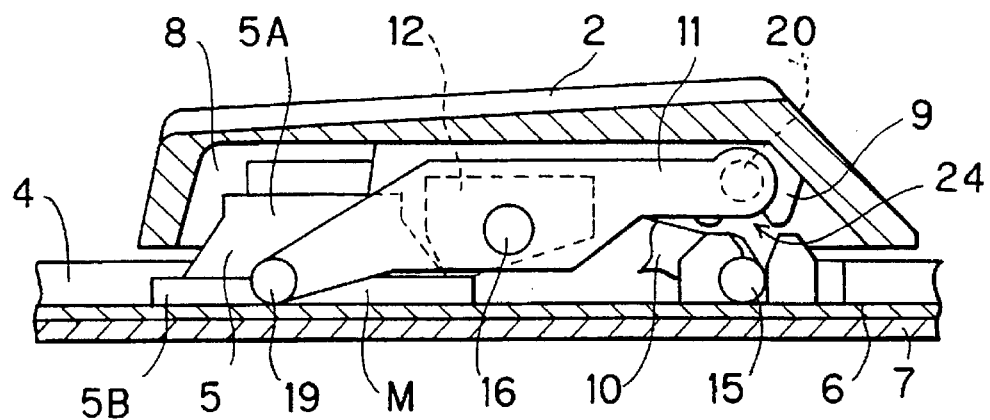
FIG. 9 is a cross-sectional view showing the key when the data processing device is in the non-operation condition.

As will be described later, while the lid 62 is in a closed condition shown in FIG. 6, the keyboard 61 is in a non-operation condition wherein the keys are lowered as shown in FIGS. 8 and 9. On the other hand, when the lid 62 is opened to or more than a predetermined angle A shown in FIG. 10, the keyboard 61 is in an operation condition wherein the keys are popped up shown in FIG. 2. In the operation condition, the key caps 2 of the keys are at the height that ensures optimum operability of the keyboard.

Figure 2:
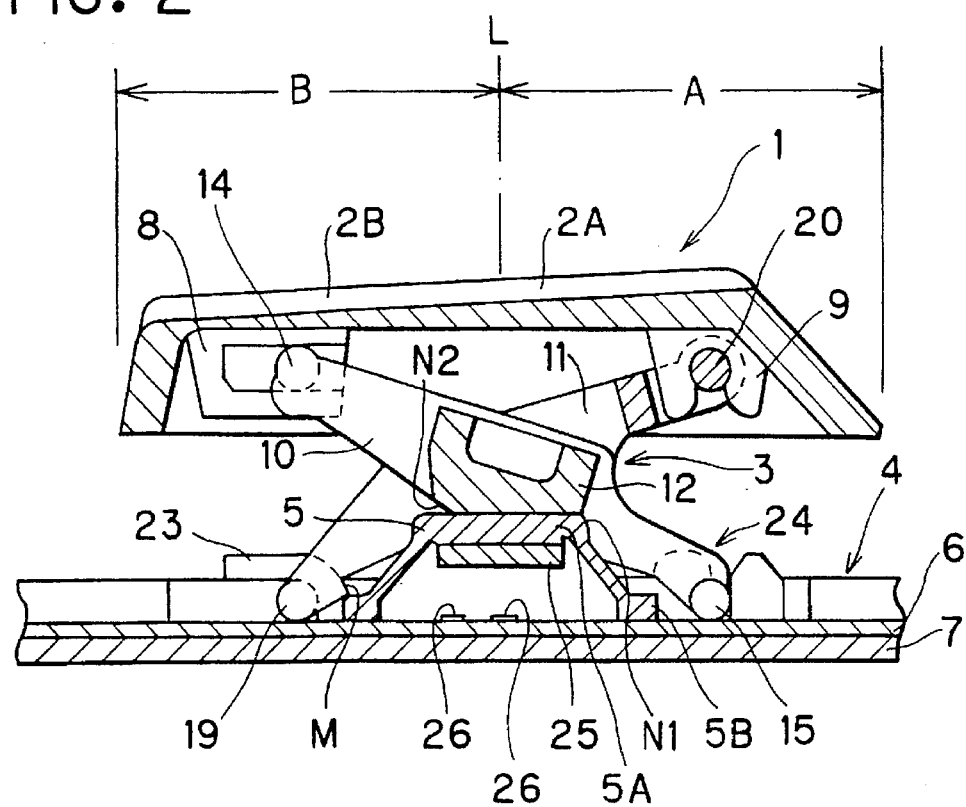
FIG. 2 is a cross-sectional view showing a representative key of the keyboard when the data processing device of FIG. 1 is in an operation condition.

As shown in FIG. 2, the key 1 includes a key top 2; a key guide 3 supported on the holder plate 4; and a rubber spring 5 attached on the circuit board 6. The key guide 3 has a first linking member 10 and a second linking member 11 for guiding vertical movement of the key cap 2 while maintaining the key cap 2 in a substantially horizontal posture.

The key cap 2 is made of a resin such as ABS resin. A character, symbol, or number for identifying the key 1 is formed to the upper surface of the key cap 2. The key cap 2 is divided by an imaginary vertical line L, which is defined by shafts 16 (to be described later) provided to the first linking member 10, into a front half 2A (that is, leftward of the vertical line L as viewed in FIG. 2) and a rear half 2B (that is, rightward of the vertical line L as viewed in FIG. 2) so that a length A of the front half 2A is longer than a length B of the rear half 2B. A pair of first engagement members 8 (only one of which is shown in FIG. 2) are provided to the front half 2A. Each of the first engagement members 8 is formed with an elongated groove. A pair of second engagement members 9 (only one of which is shown in FIG. 2) are provided to the rear half 2B. Each of the second engagement members 9 is formed with a circular groove.

Figure 3:
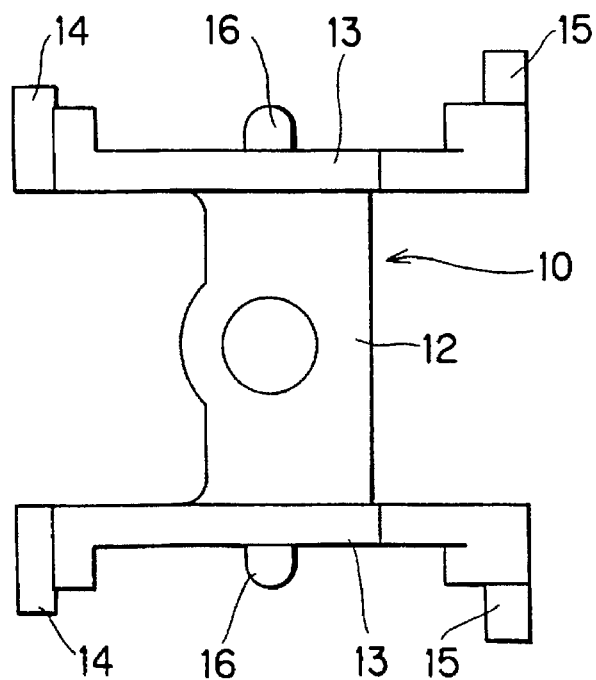
FIG. 3 is a planar view showing a first linking member of a guide member of the key.

The first linking member 10 is formed from a resin such as polyacetal resin. As shown in FIG. 3, the first linking member 10 has an H-shape as viewed in FIG. 3 and includes a cross plate 12 and a pair of side plates 13 provided on either side of the cross plate 12. A first sliding pin 14 for slidably engaging in one of the first engagement members 8 is formed at one end of each side plate 13. An outwardly protruding engagement pin 15 is formed to the other end of each side plate 13. One of the above-mentioned shafts 16 is provided to protrude outward from near the center of each of the side plates 13. A bevelled edge N2 is bevelled in the side rim (to the left of FIG. 2) of the cross plate 12 of the first linking member 10.

Figure 4:
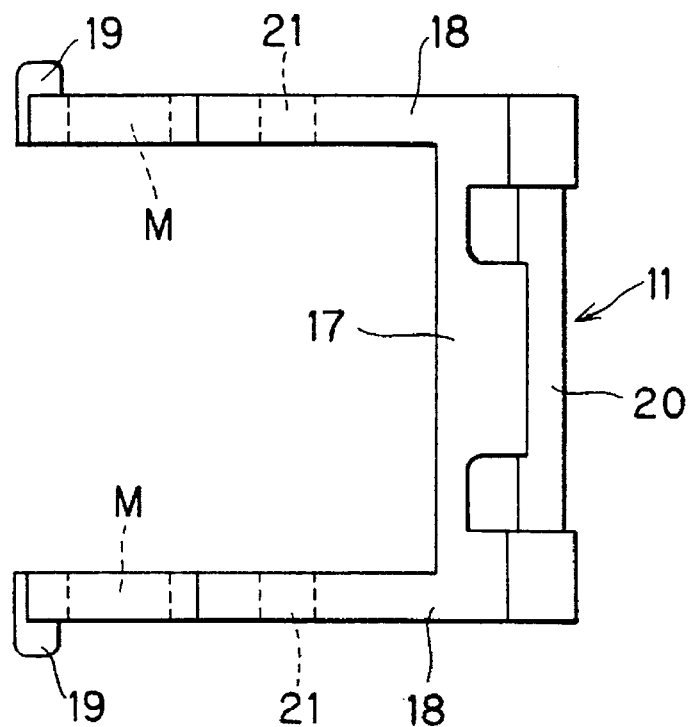
FIG. 4 is a planar view showing a second linking member of the guide member.

The second linking member 11 is formed from a resin such as polyacetal resin. As shown in FIG. 4, the second linking member 11 has a U-shape as viewed in FIG. 4 and includes a cross plate 17 and a side plates 18 formed to either side of the cross plate 17. A sliding pin 19 is formed to the tip of each side plate 18. A second engagement pin 20 for pivotably engaging with the second engagement members 9 is formed between the side plates 13 at a position near the cross plate 17. An engagement groove M is formed near the sliding pin 19 of each side plate 18. A support hole 21 for pivotably supporting one of the shafts 16 is formed in each of the side plates 18.

It should be noted that the first linking member 10 and the second linking member 11 are designed so that the distance from the center of the shaft 16 to the center of the first sliding pins 14 and the engagement pins 15 is equal to the distance from the center of the support hole 21 to the center of the second engagement pin 20 and the sliding pin 19.

The holder plate 4 is formed from the same resin as the key cap 2. The holder plate 4 is formed in an integral unit that serves all the keys 1 of the keyboard 61. A plurality of substantially square-shaped attachment holes 22 (see FIG. 8) exposing the circuit board 6 at positions corresponding to individual keys 1 are formed in the holder plate 4. Rubber springs 5 are slidingly engaged in corresponding attachment holes 22. A pair of third engagement members 23 for slidingly engaging the sliding pins 19 are formed to the holder plate 4 at two corners of each attachment hole 22. A fourth engagement portion 24 in which one of the engagement pins 15 is pivotably engaged is formed to each of the other two corners of each attachment hole 22. Although each attachment hole 22 is essentially square shaped, one side is formed with a curved wall CW.

The circuit board 6 is either a flexible circuit board made from a PET film or a solid circuit board made from paper phenol or glass epoxy resin, and the like. A circuit pattern including fixed electrodes 26 is formed on the circuit board 6. Staking or screws are provided at predetermined positions of the holder plate 4 and the support plate 7 to maintain a clearance space therebetween. The circuit board 6 is supported on the support plate 7 so as to be slidable in the space.

The rubber spring 5 is formed from an elastic rubber such as silicon rubber or EPDM. The rubber spring 5 includes a conical dome 5A, a rim 5B formed to the periphery of the dome 5A, and, as shown in FIG. 8, two stoppers 5C extending from the rim 5B. A bevelled edge N1 is bevelled around the upper rim of the dome 5A. A mobile electrode 25 formed from conductive rubber is fixed to the upper surface of the dome 5A. It should be noted that the mobile electrode 25 is disposed at positions shifted slightly rightward (as viewed in FIG. 2) from the pair of fixed electrodes 26 formed on the circuit board 6, or said differently, the pair of fixed electrodes 26 are shifted slightly leftward from the vertical line L. Also, the curved shape of the rim 5B matches the curved shape of the curved wall CW.

Because the rubber spring 5 is fixed to the circuit board 6, it slides in association with sliding movements of the circuit board 6. Therefore, the rubber spring 5 can be slid between the operation condition shown in FIG. 2 and non-operation condition shown in FIG. 9 by sliding the circuit board 6 in association with the lid 62 in a manner to be described later. When the key 1 is in the operation condition, the rubber spring 5 is disposed on the circuit board 6 at a position corresponding to the pivotal axis (defined by the shafts 16 and the support holes 21) of the first linking member 10 and second linking member 11. The cross plate 12 of the first linking member 10 is mounted on top of the dome 5A so that the dome 5A of the rubber spring 5 elastically supports the key guide 3 formed from the first linking member 10 and the second linking member 11. When the key 1 is in the non-operation condition, the rubber spring 5 is shifted to the side of the attachment hole 22, the two stoppers 5C are engaged in the engagement grooves M, and the side of the rim 5B is in contact with the curved wall CW. When the word processor is in the non-operation condition, the rubber spring 5 is housed completely under the front half 2A of the key cap 2. This saves space so that word processor is thinner without danger of permanently deforming the rubber spring 5 even if the word processor is stored closed for long periods of time.

To assembly the guide member 3, first, the shafts 16 are fitted in the support holes 21 to pivotally support the second linking member 11 on the first linking member 10. This pivotal support allows the first linking member 10 and the second linking member 11 to pivot between a spread position to a less spread position. Then, while the rubber spring 5 is in the operation condition, the sliding pins 19 are fitted into respective third engagement members 23 and the engagement pins 15 are snapped into respective fourth engagement portions 24. The holder member 4 supports the guide member 3. Also, the cross plate 12 rests on the dome 5A.

After the guide member 3 is supported, the key cap 2 is positioned above the guide member 3. The first sliding pins 14 are fitted into the first engagement members 8 and the second engagement pins 20 are snapped into the second engagement members 9. This completes assembly of the key 1. In conventional keyboards, a guide stem is provided for each key for guiding vertical movement of the keys. The structure of the guide member 3 allows elimination of guide stems so that the keyboard can be made with a slimmer shape.

Figure 5:
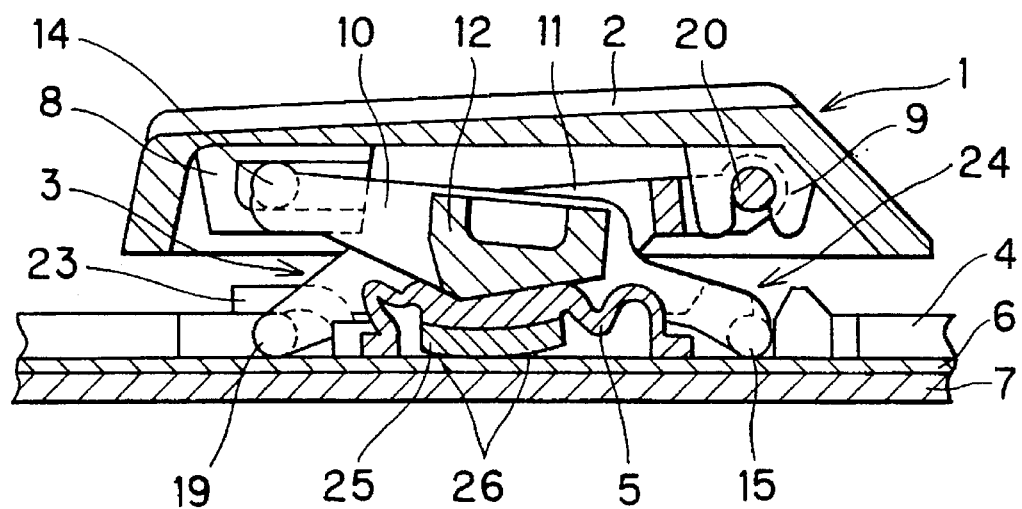
FIG. 5 is a cross-sectional view showing the key in a depressed condition.

Next, an explanation of how components of the key 1 operate to connect a circuit when the key 1 is depressed will be provided while referring to FIGS. 2 and 5. When the key cap 2 is depressed from the condition shown in FIG. 2, each first sliding pin 14 of the first linking member 10 slides leftward within the first engagement members 8 while the engagement pin 15 pivots counterclockwise within the fourth engagement portion 24. Simultaneously with this, the second engagement pin 20 of the second linking member 11 pivots clockwise within the first engagement members 8 while the sliding pin 19 slides rightward within the third engagement member 23. At this time, cooperative movement of the first linking member 10 and the second linking member 11 moves the key cap 2 downward while maintaining the key cap 2 in a vertical condition.

With downward movement of the key cap 2, the cross plate 12 of the first linking member 10 gradually presses down the dome 5A of the rubber spring 5. When the downward force exceeds a set limit, the dome 5A buckles with a clicking sensation. When the sides of the rubber spring 5 buckle as shown in 5, the sliding of the each first sliding pin 14 leftward within the first engagement members 8 and each sliding pin 19 rightward within the third engagement members 23 shifts the mobile electrodes 25 slightly leftward (as viewed in FIG. 2), thereby bringing the mobile electrodes 25 into contact with the immobile electrodes 26. The mobile electrodes 25 and the immobile electrodes 26 operate like a switch to connect a circuit. Therfore, the buckling of the rubber spring 5 performs an ON switching operation which connects the circuit of the immobile electrodes 26 formed on the circuit board 6 and results in an ON condition.

When the downward pressure is released from key cap 2, the cross plate 12 of the first linking member 10 is urged upward by the elasticity of the rubber spring 5. The first sliding pin 14 of the first linking member 10 slide rightward in the first engagement members 8 and the engagement pin 15 pivot clockwise in the fourth engagement portion 24. Simultaneously with this, the second engagement pin 20 of the second linking member 11 pivots counterclockwise within the second engagement members 9 and the sliding pin 19 slides rightward within the third engagement member 23. In concert with this, the dome 5A of the rubber spring 5 gradually returns to its original condition, which separates the mobile electrode 25 from the immobile electrodes 26. This produces an OFF switching operation that brings the circuit of the immobile electrodes 26 into an OFF condition. The elasticity of the rubber spring 5 returns the key cap 2 to its original unpressed level shown in FIG. 2. While the key cap 2 is returning to its original level, cooperative action of the first linking member 10 and the second linking member 11 maintain the key cap 2 in an horizontal posture in the same manner as when the key cap 2 is pushed down.

Figure 6:
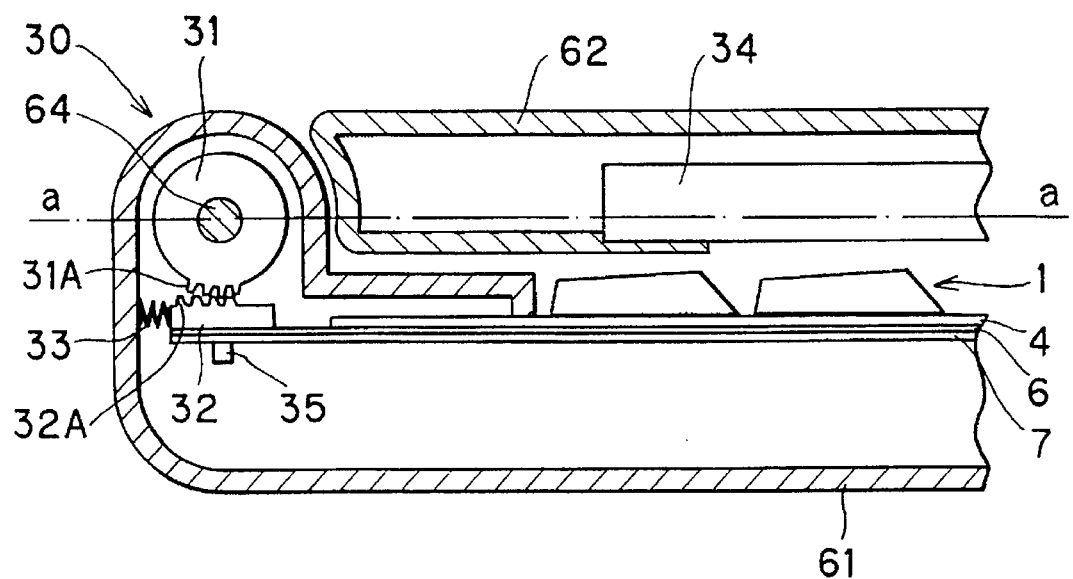
FIG. 6 is a cross-sectional view showing the data processing device when a lid thereof is in a closed condition.
Figure 7:
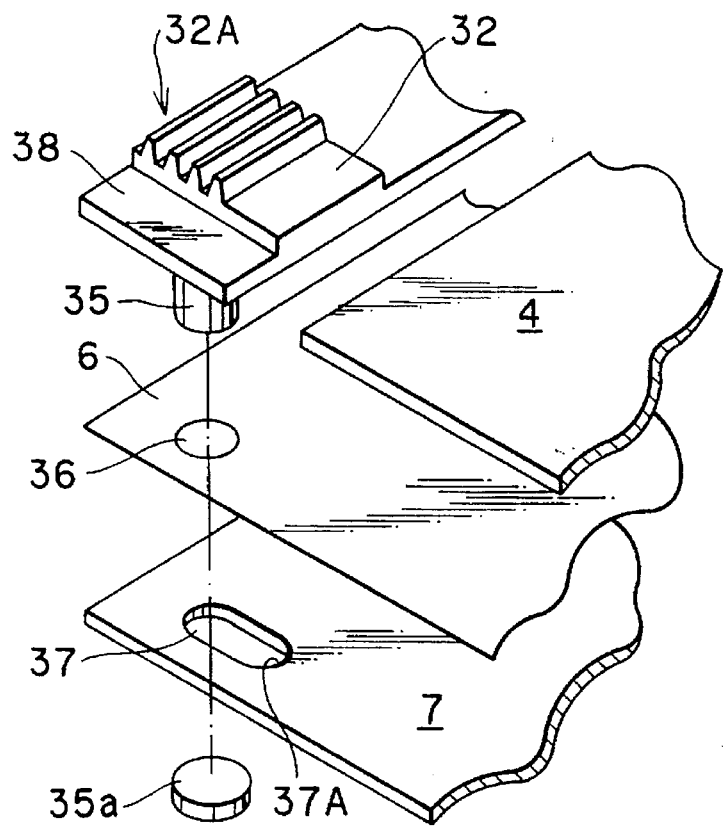
FIG. 7 is an exploded perspective view showing essential portions of a slide connection assembly of the keyboard.

Next, an explanation of a slide connection assembly 30 for sliding the circuit board 6 of the key 1 in correspondence with the opening and closing operations of the lid 62 and of a spring 33 for urging the circuit board 6 in a predetermined direction will be provided while referring to FIGS. 1, 6, and 7. As shown in FIGS. 1 and 6, the slide connection assembly 30 includes basically a partial gear 31 fixed to the shaft 64; and a rack 32 fixed on the circuit board 6. The partial gear 31 is so named because gear teeth 31A are formed to only a portion of its outer periphery. The rack 32 has rack teeth 32A.

As shown in FIGS. 1 and 6, the partial gear 31 is fixed to the same shaft 64 for opening and closing actions of the lid 62. Accordingly, the slide connection assembly 30 moves with the opening and closing action of the lid 62 in association with the shaft 64. That is, the partial gear 31 rotates counterclockwise (as viewed in FIG. 6) when the lid 62 is pivoted open and clockwise when the lid 62 is pivoted close. Gear teeth 31A are provided only at areas of the partial gear 31 to allow their engagement with the rack teeth 32A of the rack 32 while the lid 62 is pivoted open less than the predetermined angle A shown in FIG. 10. When the lid 62 is opened up to predetermined angle A, the lid 62 is almost closed so that operation of the keys is impossible.

As shown in FIG. 6, the rack 32 is formed integrally to a reinforcement plate 38. The reinforcement plate 38 is fixed to the circuit board 6 to which the rubber spring 5 is attached. The reinforcement plate 38 extends from one end of the laptop word processor 60 to the other in the lengthwise direction. However, the rack 32 is located at a position separated from the keys 1. As shown in FIG. 7, a guide pin 35 is formed to the underside of the reinforcement plate 38. At positions corresponding to the guide pin 35, a guide hole 36 is opened in the circuit board 6 and an elongated slide hole 37 having a movement-restricting wall 37A is opened in the support plate 7. The guide pin 35 in inserted through the guide hole 36 and the slide hole 37 so that the reinforcement plate 38 and the circuit board 6 will slide in association with each other without the reinforcement plate 38 moving askew. A flange 35a with a diameter greater than that of the guide pin 35 is screwed or staked to the end of the guide pin 35 to prevent the guide pin 35 from pulling out of the guide hole 36 and the slot 37.

The spring 33 for urging the circuit board 6 rightward (as viewed in FIG. 6) is fixed at one end to the rack 32 and at the other end to housing of the keyboard 61. Therefore, when the gear teeth 31A disengage from the rack teeth 32A, the circuit board 6 will be urged by the spring 33 to the maximum limit allowed by the stroke of the elongated hole 37. However, provision of the spring 33 is not an absolute necessity. Other means can be provided for stopping the circuit board 6 at a position for maintaining the keys at the height for optimum operability when the gear teeth 31A and the rack teeth 32A disengage from each other after the lid 62 is opened to the predetermined angle A.

Although one slide connection assembly 30 and spring 33 are provided at either end of the shaft 64 in the present embodiment, more can be provided to increase the urging force acting on the circuit board 6 as long as they allow ready opening and closing of the lid 62 via the hinge 63. However, it is desirable that sees of slide connection assemblies 30 and springs 33, or similar urging means, be provided at predetermined intervals along the shaft 64 in order to transmit the urging force uniformly to the circuit board 6.

Next, an explanation of operations of the slide connection assembly 30 and the spring 33 will be provided. First, an explanation of operations of the slide connection assembly 30 and the spring 33 performed from when the lid 62 moves between a closed position to a position opened more than predetermined angle A will be provided while referring to FIGS. 6, 8, 9, 10, 11, and 13.

When the lid 62 is in a closed condition, the rubber spring 5 is maintained in the position shown at the lefthand side of FIG. 8 and the cross plate 12 is separated from the dome 5A. That is, the rubber spring 5 is in the non-operation condition separated from the key guide 3 so that the key cap 2 does not receive the elastic force of the rubber spring 5. Accordingly, the first linking member 10 and the second linking member 11 are completely folded on top of the circuit board 6 so that the height of the key cap 2 is at a non-operation level, which is the lowest position shown in FIG. 9.

When the operator starts opening the lid 62 from the closed position indicated by line a—a of FIG. 6, the shaft 64 rotates counterclockwise (as viewed in FIG. 10) with pivoting of the hinge 63. Rotation of the shaft 64 rotates the partial gear 31 fixed thereto. Because the gear teeth 31A and the rack teeth 32A are in engagement with each other when the lid 62 is in the closed position, the counterclockwise rotation of the partial gear 31 slides the rack 32 rightward (as viewed in FIG. 10) along a path traveled by the guide pin 35 in the slide hole 37. As a result, the circuit board 6 to which the rack 32 is affixed also slides rightward (as viewed in FIG. 10) when the lid 62 is opened up. Because the reinforcement plate 38 is provided from one end of the word processor 60 to the other, sliding action of the circuit board 6 is smooth and stable.

Figure 10:
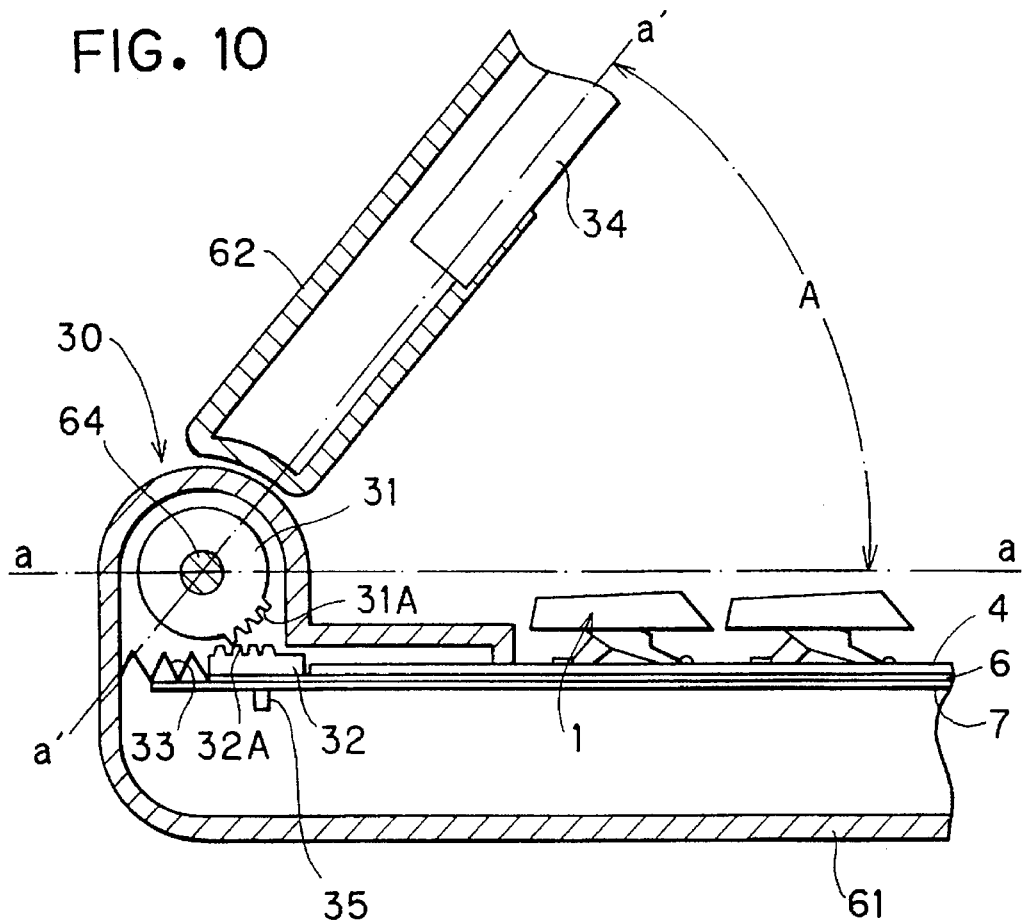
FIG. 10 is a cross-sectional view showing the key when the lid of the data processing device is pivoted open to a predetermined angle.

When the lid 62 is opened up to the predetermined angle A indicated by line a'—a' of FIG. 10, the partial gear 31 and the rack 32 fall out of engagement with each other. Simultaneously with this, the guide pin 35 of the reinforcement plate 38 will abut the movement-restricting wall 37A of the slide hole 37, that is, the rightward edge as viewed in FIG. 10, so that further sliding movement of the rack 32, and consequently the circuit board 6, is prevented. Accordingly, even if the operator continues to open up the lid 62 beyond predetermined angle A, the rack 32 will not move any further rightward (as viewed in FIG. 10). While the partial gear 31 and the rack 32 are in engagement, the urging force of the spring 33 assists the opening movement of the lid 62 so that the operator can easily open the lid 62. When the partial gear 31 and the rack 32 come out of engagement, the spring 33 constantly urges the reinforcement plate 38 rightward (as viewed in FIG. 10) so that the circuit board 6 will not move back leftward (as viewed in FIG. 10).

Figure 11:
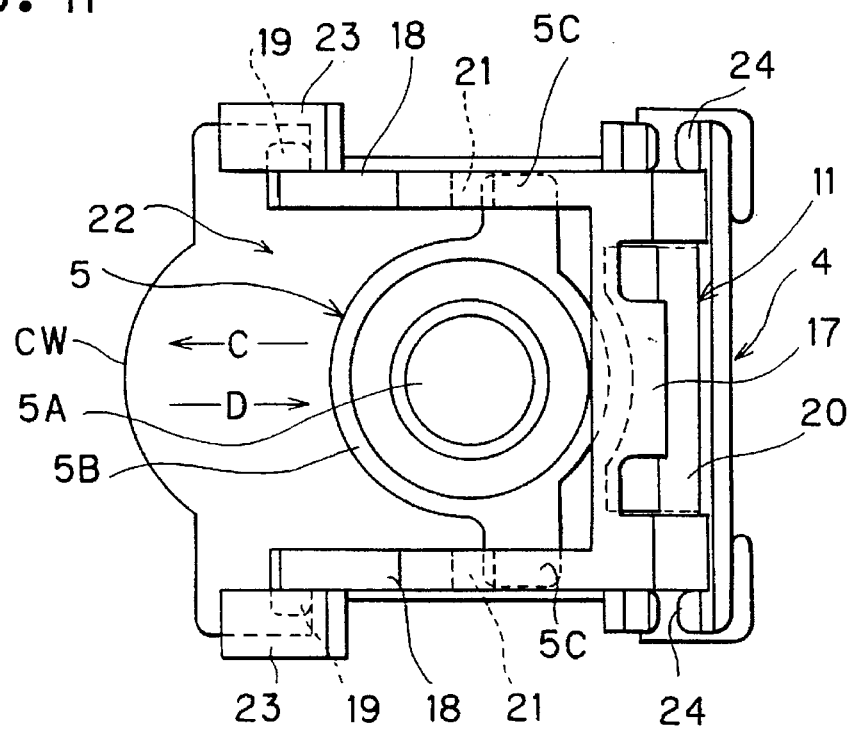
FIG. 11 is a bird's eye view showing the rubber spring and the second linking member when the data processing device is in the operation condition.
Figure 12:
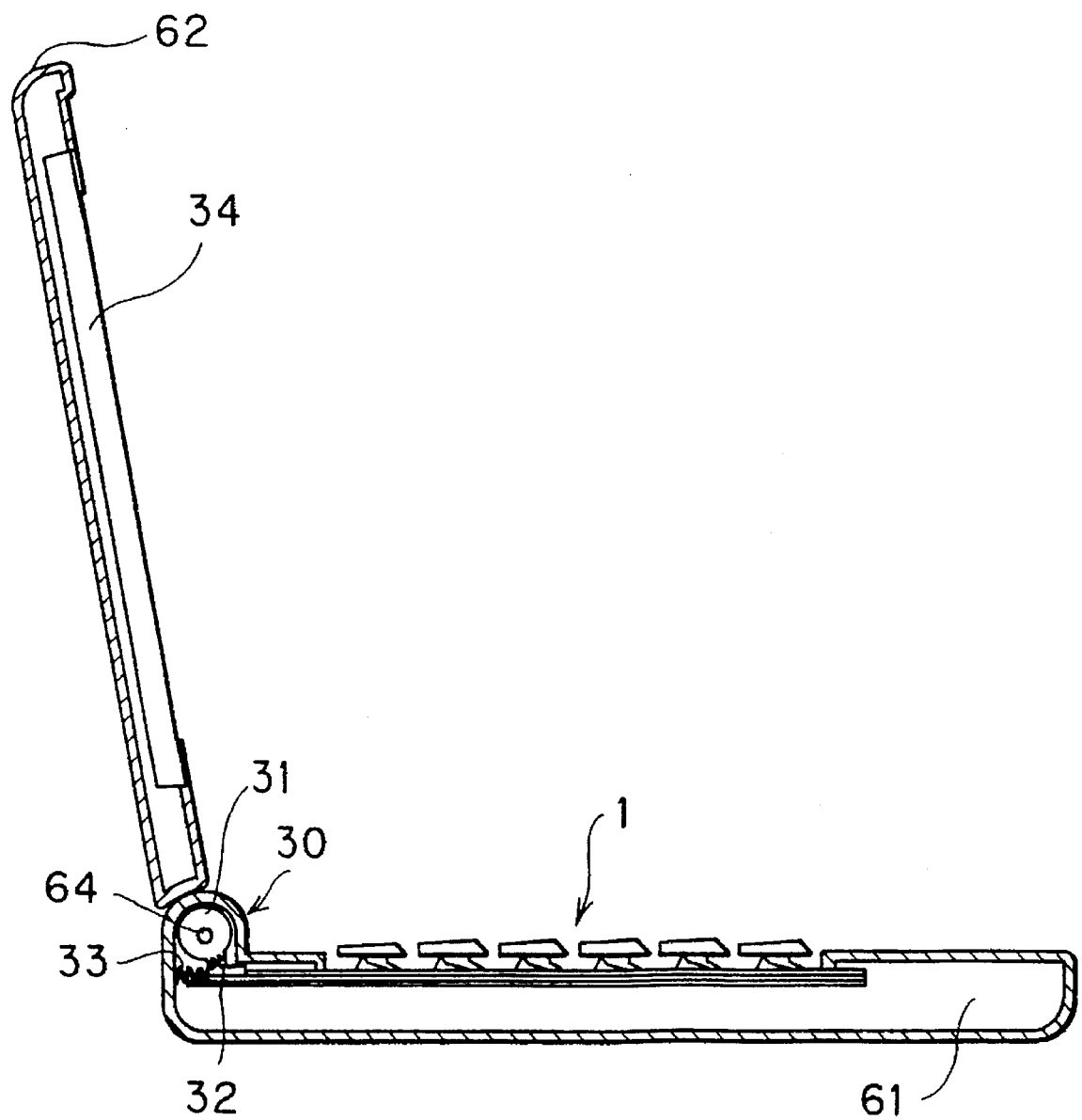
FIG. 12 is a cross-sectional view showing the data processing device when the lid is pivoted open beyond the predetermined angle.

In association with the sliding movement of the circuit board 6, the word processor 60 is brought from the non-operation condition to the operation condition. The second link 11 rises up, thereby releasing the stopper 5C from the groove M. The rubber spring 5 of the key 1 is moved in the direction D shown in FIG. 11. That is, the rubber spring 5 slides from the non-operation condition shown in FIG. 8 to the operation condition for supporting the key guide 3 as shown in FIG. 11. The dome 5A shifts under the base 12 until the base 12 sets on the dome 5A. The bevelled edges N1 and N2 cooperate to smoothly shift the rubber spring 5 under the base 12 and guide the key guide 3 into the operation condition where it is mounted on the rubber spring 5. Accordingly, the key guide 3 changes from the folded up condition shown in FIG. 9 to the unfolded condition shown in FIG. 2. The key cap 2 also rises upward from the non-operation level to the operation level.

When the rubber spring 5 is maintained in the operation condition by the urging of the spring 33, the key cap 2 is maintained in the operation level. That is, the height of the key caps 2 does not change after the lid 62 is opened to the predetermined angle A or beyond.

Accordingly, while the lid 62 is between the closed condition and the predetermined angle A, the slide connection assembly 30 and the spring 33 operate to connect movement of the lid 62 with change in height of the key cap 2. Additionally the height of the key cap 2 stops changing when the lid 62 is opened to the predetermined angle A or greater.

When the operator opens the lid 62 to the predetermined angle A indicated by the line a'—a' of FIG. 10, the partial gear 31 and the rack 32 fall out of engagement. Therefore, regardless of how far the operator opens the lid 62 beyond the predetermined angle A, the height of the keys 2 will remain at the operation level.

Figure 13:
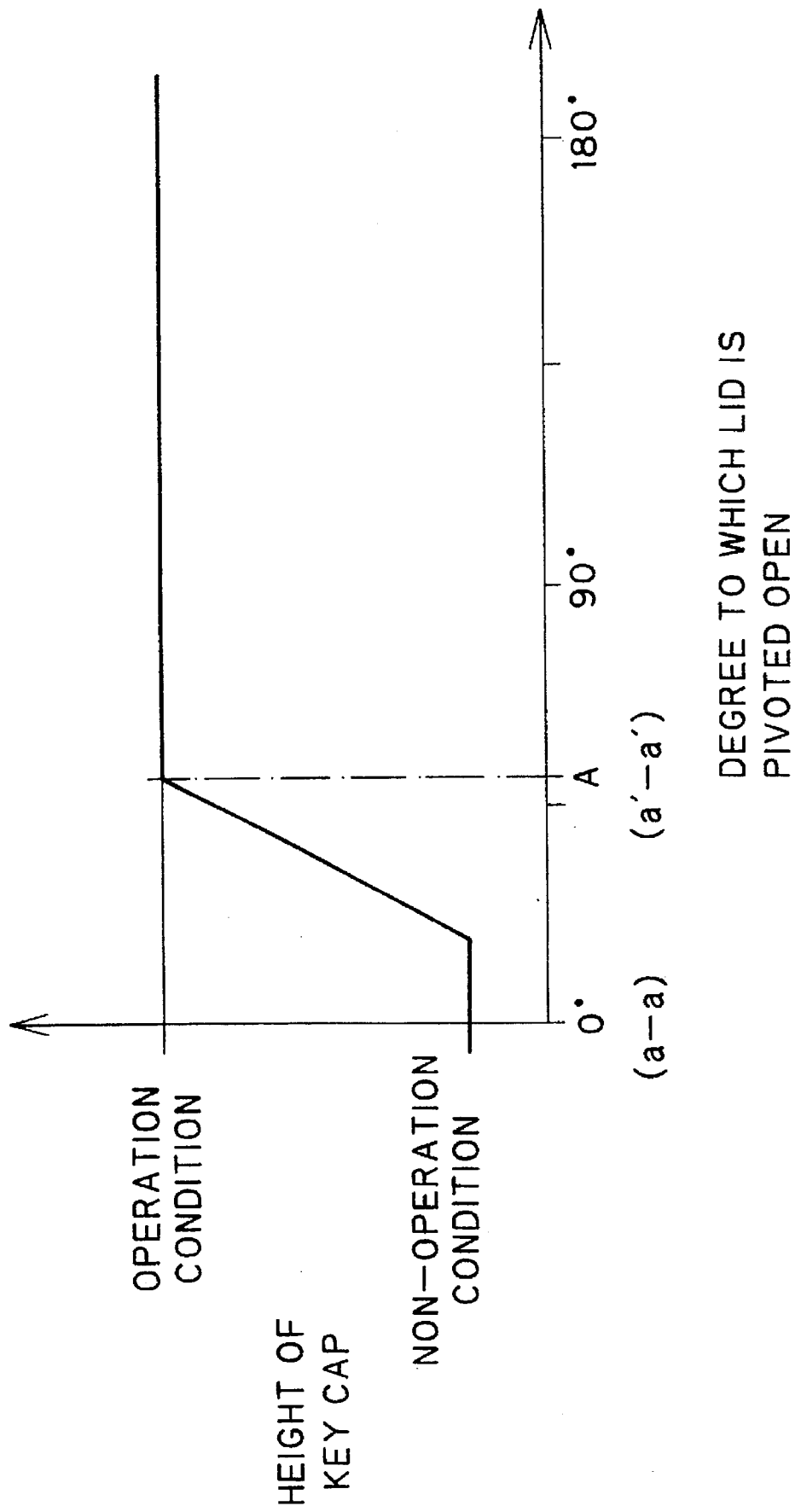
FIG. 13 is a chart representing relation between height of the key and degree to which the lid is pivoted open.

As shown in FIG. 13, because the circuit board 6 does not slide any further once the lid 62 has been opened to the predetermined angle A, the height of the key caps 2 will remain unchanged at the operation level. This allows stable operation of the keys regardless of the angle of the lid 62 and allows the operator to adjust the angle of the lid 62 to the angle where the LCD 34 on the lid 62 is easiest to see.

Next, an explanation of closing operation of the lid 62 will be provided while referring to FIGS. 6, 8, 9, 10, 11, and 13. The height of the key caps 2 will remain unchanged while the lid 62 is pivoted downward toward the closed position but is still opened to or greater than the predetermined angle A. However, the partial gear 31 and the rack 32 will come into engagement when the lid 62 is closed more than the predetermined angle A. Accordingly, closing movement of the lid 62 will move the rack 32 against the urging force of the spring 33 so that the circuit board 6 slides leftward (as viewed in FIG. 10). In association with movement of the circuit board 6, the rubber spring 5 moves in the direction C shown in FIG. 11. That is, the rubber spring 5 moves from the non-operation condition of FIG. 11 to the operation condition of FIG. 8. Accordingly, the key guide 3 gradually folds so that the key caps 2 move from the operational level to the non-operation level.

When the lid 62 is closed more than the predetermined angle A, the partial gear 31 and the rack 32 will engage so that the slide connection assembly 30 slides the circuit board 6, thereby shifting the rubber spring 5 into the non-operation condition. In association with this, the key cap 2 is maintained at the non-operation level. Change in height of the key cap 2 is completed when the lid 62 is in the closed position shown in FIG. 13.

When the lid 62 is in the closed condition, the partial gear 31 and the rack 32 are in engagement with each other. Because the stoppers 5C formed in the rubber spring 5 are caught in the engagement grooves M formed in the second linking member 11 when the link 11 pivots toward the circuit board 6, as shown in FIG. 8, the stoppers 5C are engaged in the grooves M in the non-operation condition. Therefore, the circuit board 6 will not slide even if the word processor is subjected to vibration or shock when transported in the closed condition. Therefore, the key cap 2 will not bang against the lid 62 while the lid 62 is in the closed condition.

It should be noted that a gap must be provided between the reinforcement plate 38 and the holder plate 4 to allow movement of the reinforcement plate 38 for sliding the circuit board 6. However, when the reinforcement plate 38 is slid toward the holder plate 4, the circuit board 6, which is a flexible board, may bend and protrude from between the reinforcement plate 38 and the holder plate 4 under opposing forces of the reinforcement plate 38 at one side and frictional resistance at the edge of the holder plate 4 on the other. When the circuit board 6 bends, the rotational force of the lid 62 will can not be effectively transmitted to the key guide 3 so that transition of the keys 1 from the non-operation condition to the operation condition will not be smooth. Also, the circuit board 6 may crease so that it permanently retains the bent shape, whereupon the keyboard can not longer be brought into the operation condition. For these reasons, the circuit board 6 must be prevented from bending and protruding from between the holder plate 4 and the reinforcement plate 38.

Figure 14:
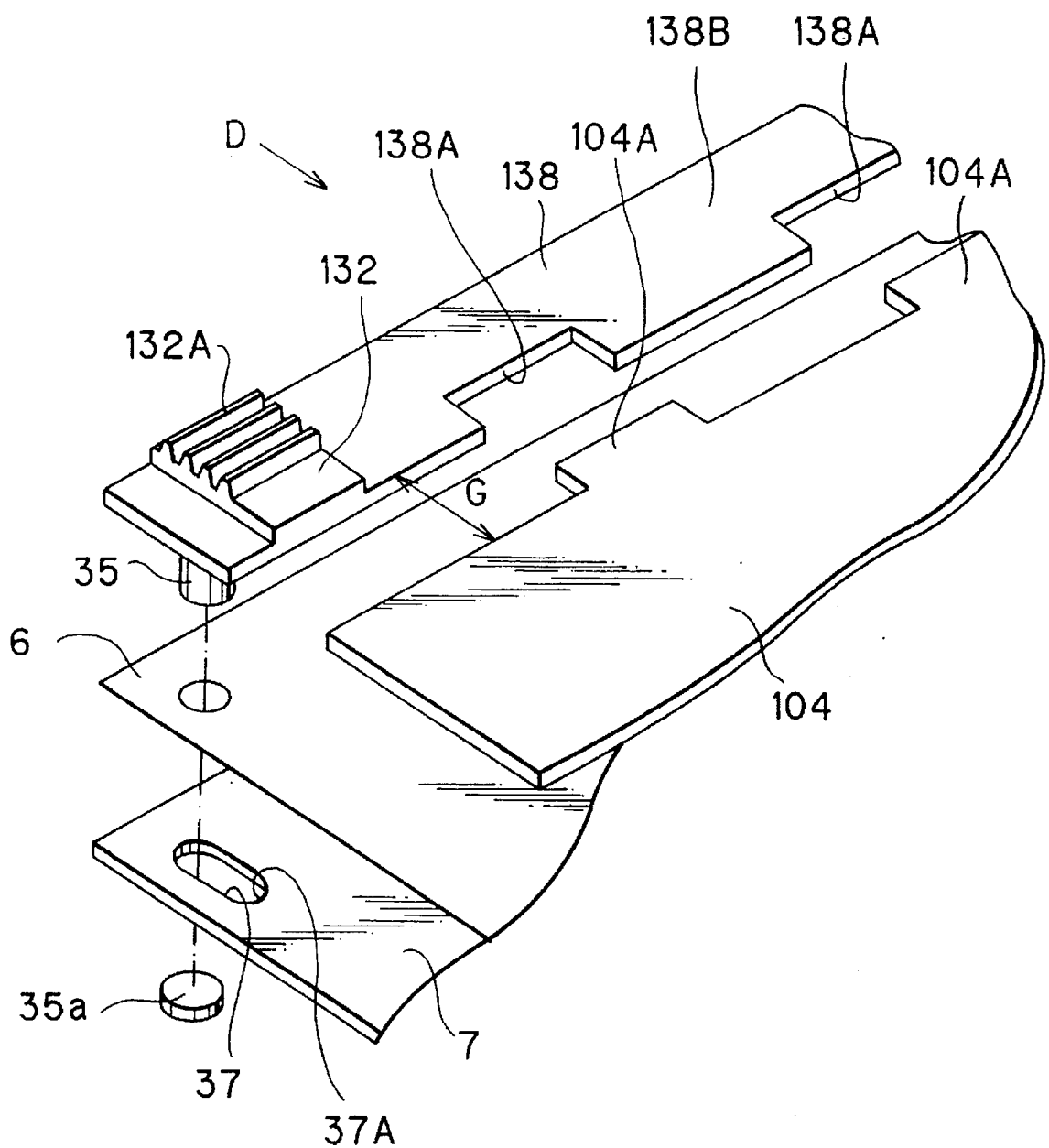
FIG. 14 is an exploded perspective view showing essential portions of a slide connection assembly of a data processing device according to a second embodiment.
Figure 15:
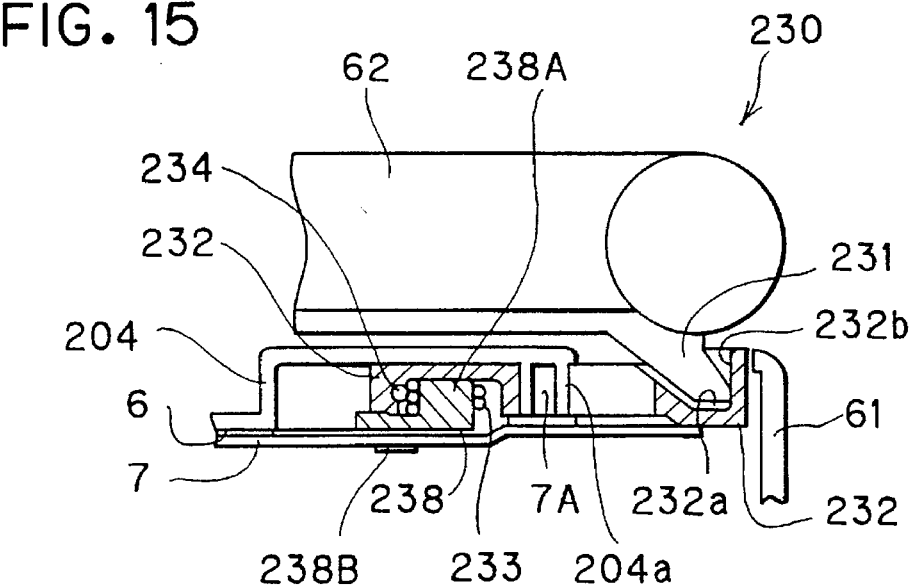
FIG. 15 is a side cross-sectional view showing a slide connection assembly of a data processing device according to a third embodiment of the present invention when a lid of the data processing device is in a closed condition.

Next, a data processing device according to a second embodiment for overcoming this problem will be described while referring to FIG. 14. In the second embodiment, a holder plate 104 and a reinforcement plate 138 are provided in place of the holder plate 4 and the reinforcement plate 38 respectively. A rack 132 with teeth 132A is integrally formed to the upper surface at each end of the reinforcement plate 138. Recesses 138A and protrusions 138B are alternately formed in the reinforcement plate 138 in an edge thereof facing the holder plate 104. Protrusions 104A are formed in the holder plate 104 in the edge thereof facing the reinforcement plate 138 at positions corresponding to the recesses 138A of the reinforcement plate 138. The holder plate 104 and the reinforcement plate 138 are formed with dimensions so that, when the keyboard is in the operation condition, a gap G at least as great as the stroke of the hole 37 is opened between the tips of protrusions 104A and valleys of recesses 138A.

The protrusions 104A and recesses 138A are meshable and therefore disrupt linearity of the gap G between the holder plate 104 and the reinforcement plate 138. Accordingly, even if the circuit board 6 is urged to bend under force applied to the reinforcement plate 138 when the reinforcement plate 138 is shifted in the direction labeled D in FIG. 14, the protrusions 104A press down on the upper surface of the circuit board 6, thereby preventing the circuit board 6 from bending and protruding from between the reinforcement plate 138 and the holder plate 104. The restricting force of the protrusions 104A is added to that of the reinforcement plate 138 and the holder plate 104, so that the circuit board 6 can be slid smoothly over the support plate 7 while maintained in a flat condition.

Figure 16:
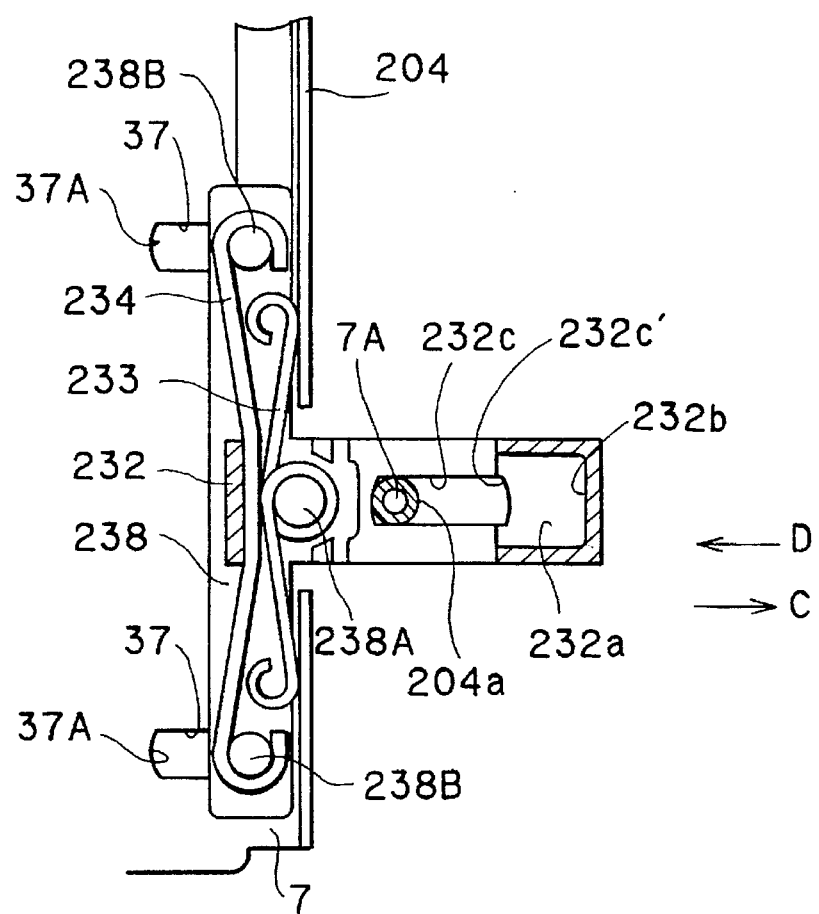
FIG. 16 is an overhead cross-sectional view showing the slide connection assembly of FIG. 15.

Next, a slide connection assembly 230 according to a third preferred embodiment of the present invention will be provided while referring to FIGS. 15 through 20. For the sake of convenience, the circuit board 6 has been omitted from FIGS. 16, 18, and 20. As shown in FIG. 16, a slide connection assembly 230 is provided near both edges of the laptop word processor 60 at the rear of the keyboard 61. Each slide connection assembly 230 includes a reinforcement plate 238, a slide member 232, a compression coil spring 233, a spring 234, and a pawl 231.

The reinforcement plate 238 includes a first protrusion 238A provided near the center of its upper surface and a pair of second protrusions 238B at opposite lengthwise ends of the reinforcement plate 238. Each second protrusion 238B protrudes both upward and downward as viewed in FIG. 15 from opposite sides of the reinforcement plate 238. The downwardly protruding portions of the second protrusions 238B are reciprocally slidingly provided in the elongated hole 37 and so function in the same manner as the guide pin 35.

The slide member 232 is an independent unit from the reinforcement plate 238 and is provided in place of the racks 32 and 132. A slot 232c is formed in the central portion of the slide member 232. A recess 232a is formed in the slide member 232 at its side nearest the rear of the keyboard 61.

A protrusion 7A protruding upward from the support plate 7 is positioned in the slot 232c. A cylindrical protrusion 204a protruding downward from the holder member 204 is engaged with the protrusion 7A. As a result, the support plate 7 supports the holder member 204. Also, sliding movement of the cylindrical protrusion 204a in the slot 232c ensures linear movement of the slide member 232.

The spring 234 connects one end of the slide member 232 to the reinforcement plate 238 so that the slide member 232 to the reinforcement plate 238 move in association. The ends of the spring 234 are fixed to the second protrusions 238B and its central portion abuts the inner edge of the slide member 232, thereby urging the slide member 232 in the leftward direction as viewed in FIG. 16. The compression coil spring 233 is wrapped around the first protrusion 238A and its ends 233 abut the wall of the holder member 204. As a result, the compression coil spring 233 urges the slide member 232 leftward as viewed in FIG. 16. Accordingly, the compression coil spring 233 and the spring 234 provide an urging force for urging the circuit board 6 into the operation condition.

The pawl 231 is provided at a position corresponding to the hinge 63 and is engagable with a wall 232b of the recess 232a. The pawl 231 corresponds to the partial gear 31 of the first and second embodiments. The pawl 231 pivots in association with pivoting movements of the lid 62, that is, in the clockwise direction, as viewed in FIGS. 15, 17, and 19, when the lid 62 is pivoted open and in the counterclockwise direction when the lid 62 is pivoted closed. The pawl 231 is formed to engage the recess 232a when the lid 62 is between the closed condition and the predetermined angle A and to fall out of engagement with the recess 232a once the lid 62 is pivoted to the predetermined angle A or greater.

When the lid 62 is closed, the pawl 231 presses the wall 232b in the direction C indicated in FIG. 16 against the urging force of the compression coil spring 233 and the spring 234. For this reason, the slide member 232 is shifted in the direction C so that, by connection of the spring 234, the reinforcement plate 238 is also shifted in the direction C, which puts the keys in the non-operation condition.

Figure 17:
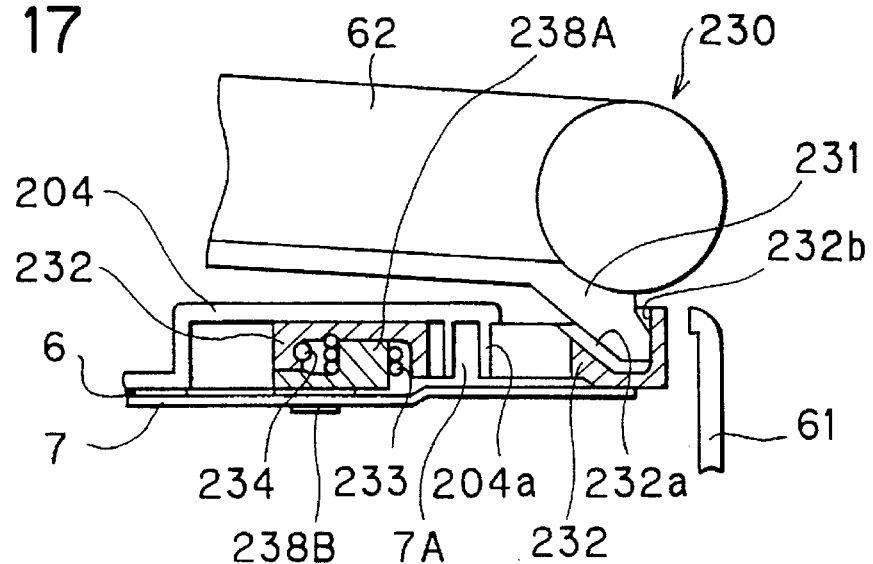
FIG. 17 is a side cross-sectional view showing the slide connection assembly when the lid of the data processing device is opened slightly.
Figure 18:
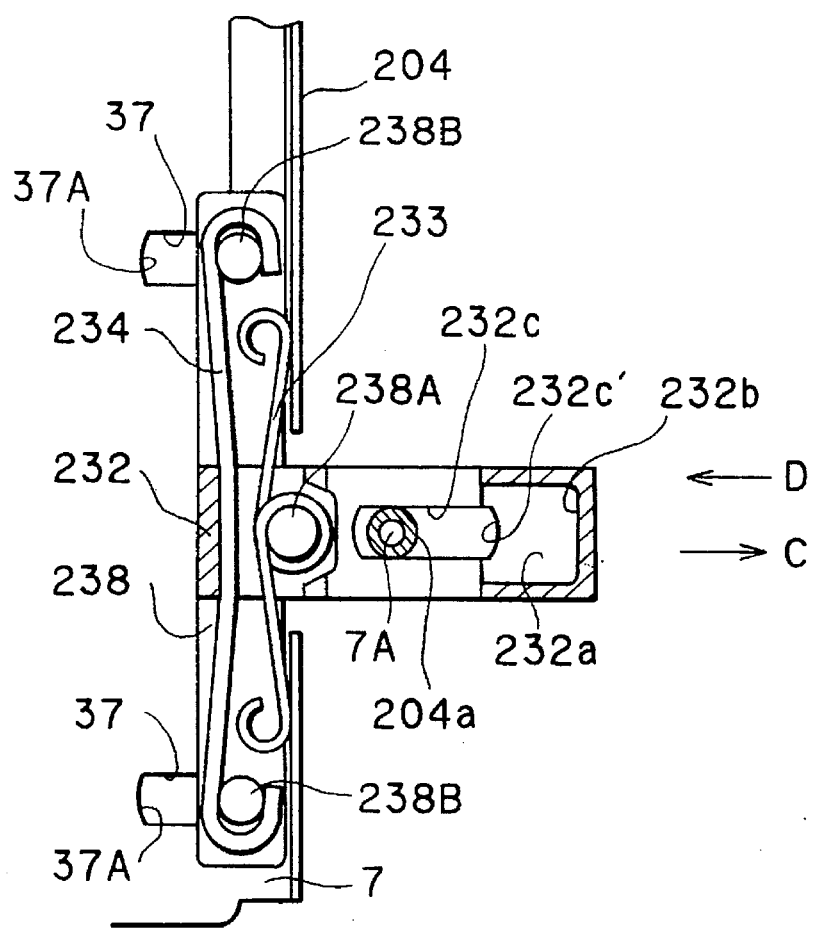
FIG. 18 is an overhead cross-sectional view showing the slide connection assembly of FIG. 17.

As shown in FIGS. 17 and 18, when an operator starts pivoting open the lid 62, the pawl 231 pivots clockwise. The urging force of the compression coil spring 233 and the spring 234 slides the slide member 232 in the direction D shown in FIG. 18 as guided by the protrusions 7a and 204a in the slot 232c. As a result, the reinforcement plate 238 is also shifted in the direction D by the compression coil spring 233 and the spring 234. While the pawl 231 is engaged with the inner wall 232b, the urging force of the compression coil spring 233 and the spring 234 urges the lid 62 open so that the operator can easily open the lid.

Figure 19:
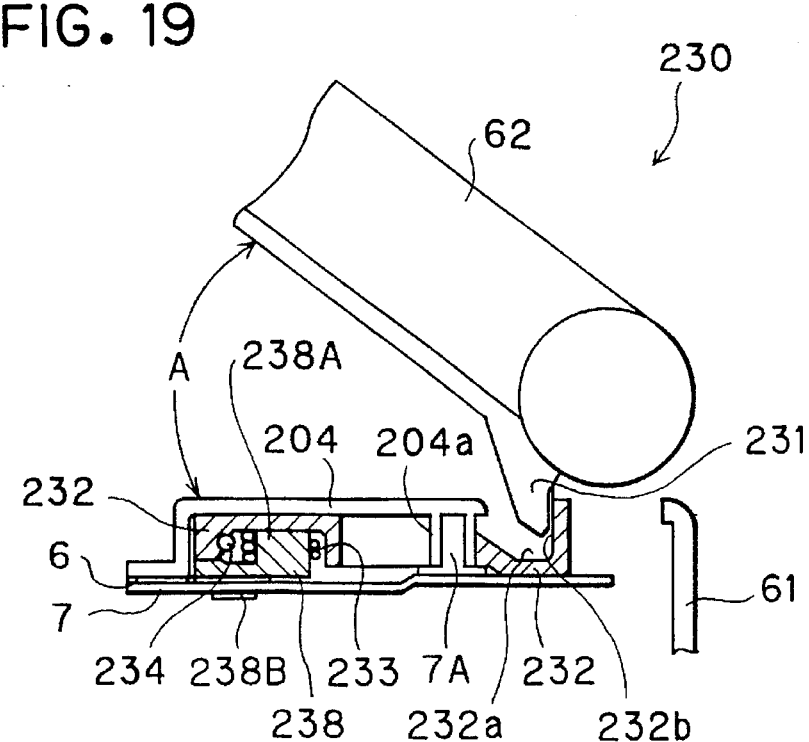
FIG. 19 is a side cross-sectional view showing the slide connection assembly when the lid of the data processing device is opened to a predetermined angle A.
Figure 20:
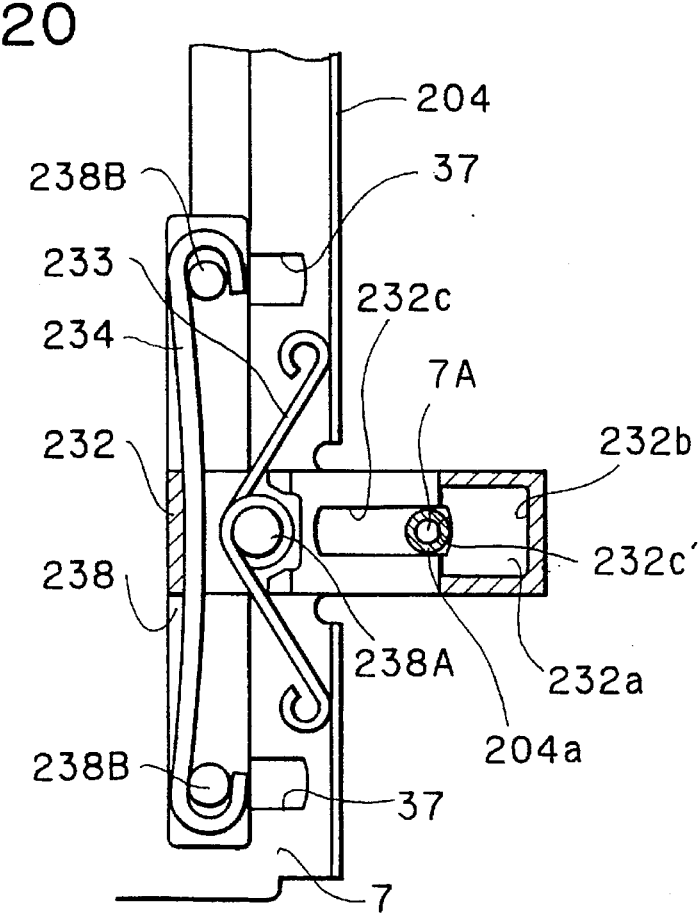
FIG. 20 is an overhead cross-sectional view showing the slide connection assembly of FIG. 19.

As shown in FIG. 19 and 20, when the operator opens the lid 62 to the predetermined angle A, the pawl 231 separates from the inner wall 232b. Therefore, the slide member 232 is further urged in the direction D by the compression coil spring 233 and the spring 234 and, in association with this, the reinforcement plate 238 and the circuit board 6 are shifted further in the direction D. Shifting movement of these components continues in the direction D until the pair of second protrusions 238B abut against movement-restricting walls 37A of respective slide holes 37 and the cylindrical protrusion 204a abuts against a movement-restricting wall 232c' of the slit 232c, whereupon the rubber spring 5 is maintained in the operation condition regardless to what angle the lid 62 is pivoted open beyond the predetermined angle A. The slide member 232 is maintained in the position shown in FIGS. 19 and 20 by the compression coil spring 233 and the spring 234. Operations of the connection mechanism when the lid 62 is pivoted closed are the opposite of the operations described for when the lid 62 is pivoted open.

Figure 21:
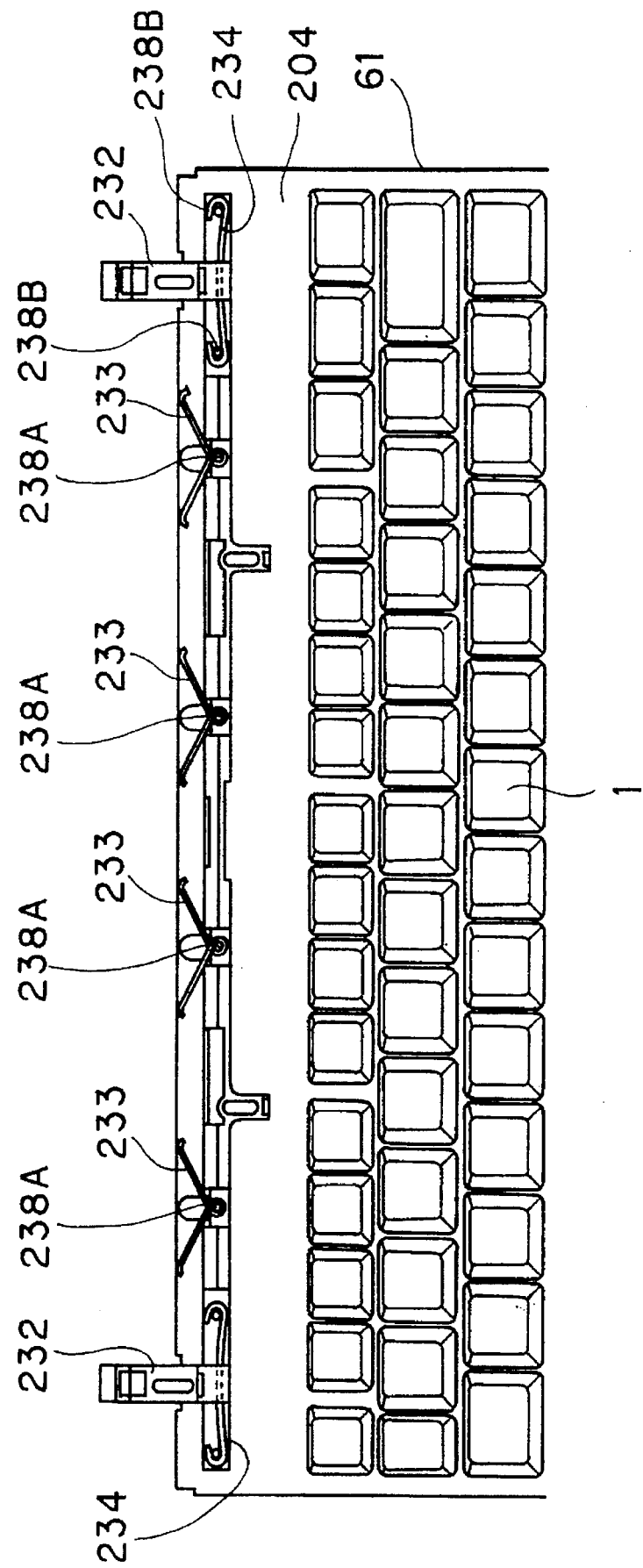
FIG. 21 is an overhead view showing a plurality of compression coil springs provided to a keyboard of a data processing device according to a fourth embodiment of the present invention.
Figure 22:
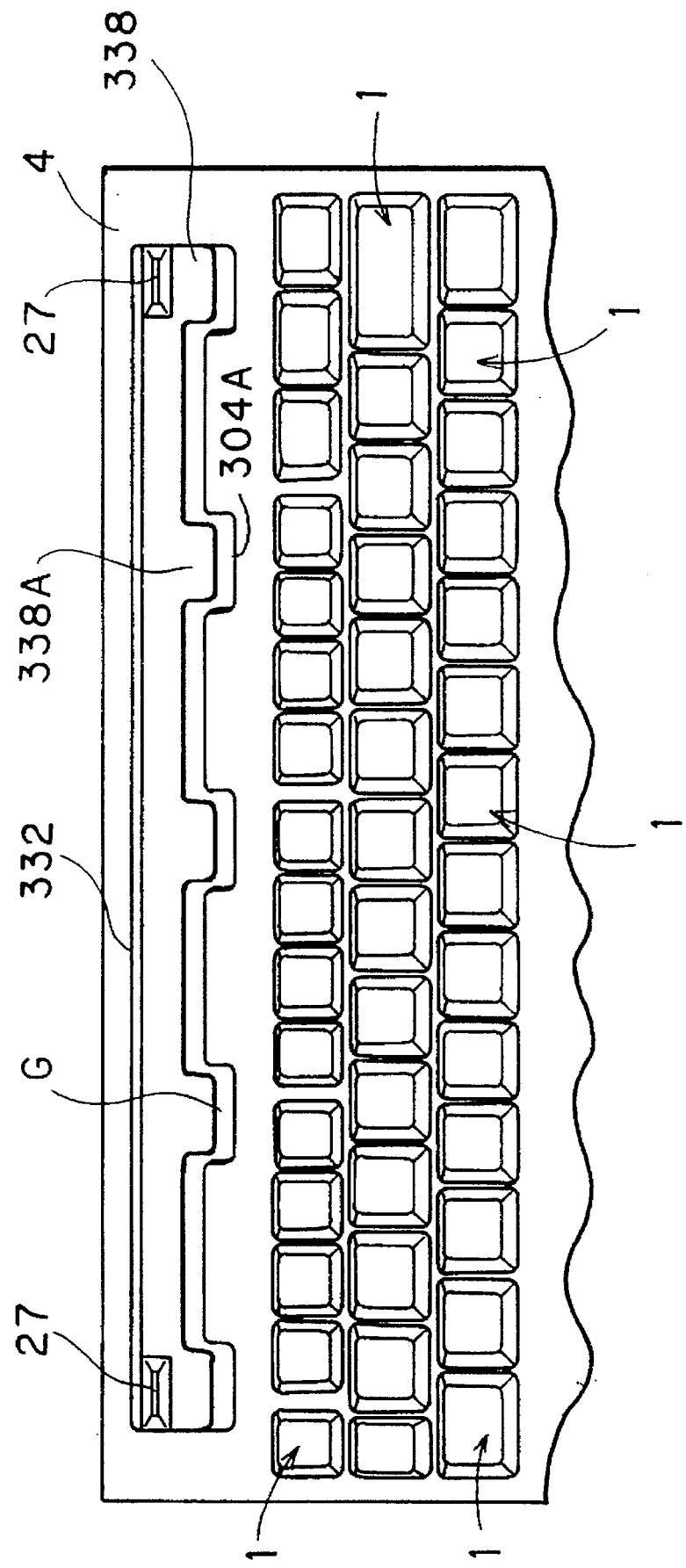
FIG. 22 is an overhead view showing a keyboard according to a fourth embodiment of the present invention.

A fourth embodiment of the present invention will be described while referring to FIG. 21. In the third embodiment, one compression coil spring 233 is provided to each connection assembly 230 of the word processor 60. However, in the fourth embodiment, more compression coil springs 233 are provided in between the pair of slide members 232. A plurality of protrusions 238A are provided to the reinforcement plate 238 at a predetermined interval between the pair of slide member 232. One of the compression coil springs 233 is wound at its center to each protrusion 238A. Each end of each compression coil spring 233 abuts against the holder member 204. The plurality of compression coil springs 233 increases the urging force acting on the circuit board 6 so that the rubber spring 5 is more reliably held in the operation condition. The urging force is also applied more uniformly. Also, each compression coil spring 233 need only apply a small urging force, so that smaller coil springs are sufficient.

Next, a keyboard according to a fifth embodiment of the present invention will be described, wherein the keyboard is manually switched between the operation condition and the non-operation condition. As shown in FIG. 1, a holder member 304 is formed with an elongated slot 332 in which is disposed a reinforcement plate 338. The reinforcement plate 338 is formed narrower than the elongated slot 332 so that the reinforcement plate 338 is slidable in the slot 332.

Figure 23:
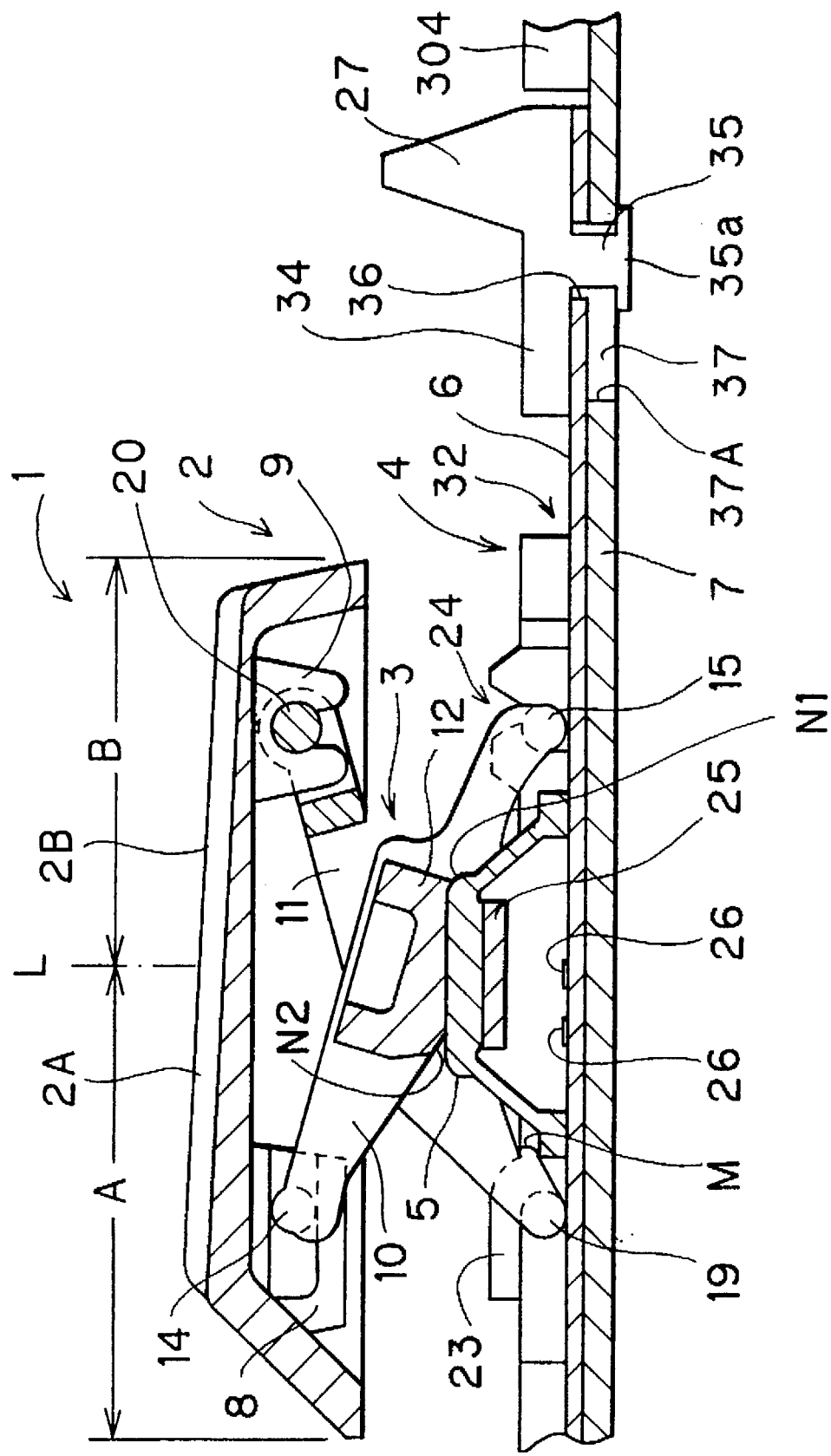
FIG. 23 is a cross-sectional view showing the keyboard in the operation condition.
Figure 24:
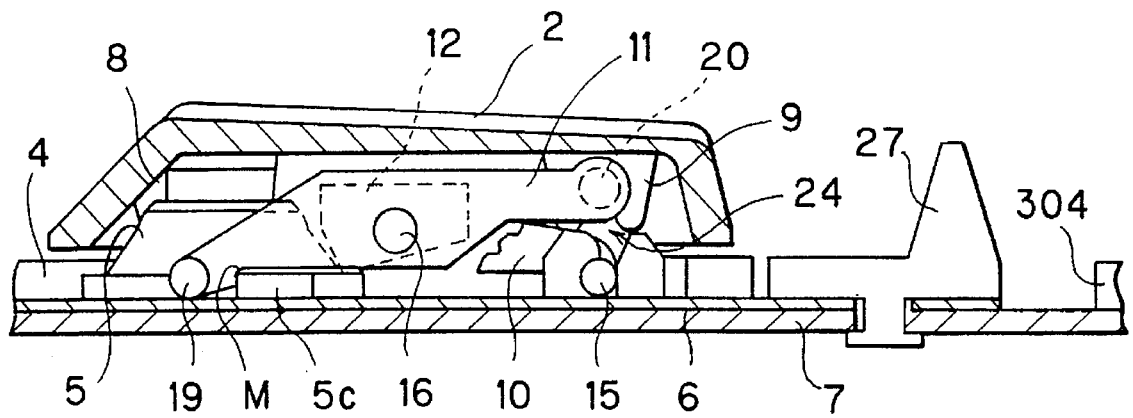
FIG. 24 is a cross-sectional view showing the keyboard in the non-operation condition.
Figure 25:
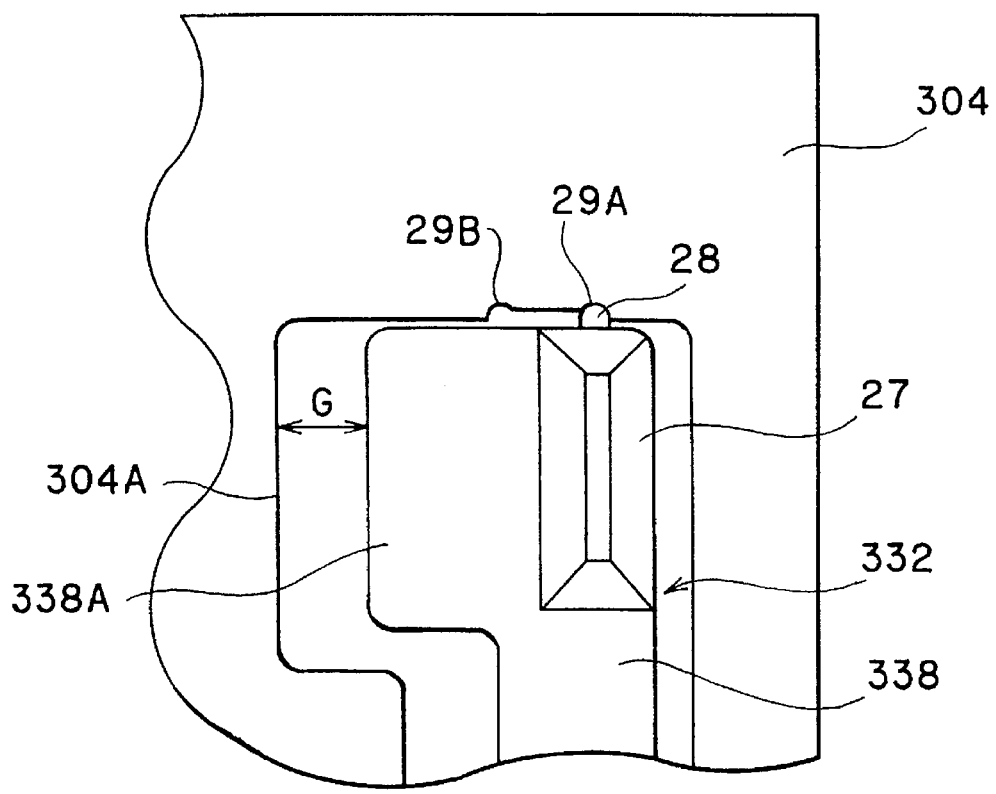
FIG. 25 is a partial bird's eye view showing a holding protrusion and notches of the keyboard.

A knob 27 for manually shifting the reinforcement plate 338 in the slot 332 between the operation condition shown in FIG. 23 and the non-operation condition shown in FIG. 24 is formed integrally to each end of the reinforcement plate 338. As shown in FIG. 25, a holding protrusion 28 protrudes from the reinforcement plate 338 in a direction perpendicular to direction in which the reinforcement plate 338 is shiftable. A first notch 29A and a second notch 29B are formed in the holding member 304 at positions corresponding to positions to which the holding protrusion 28 is shifted when the reinforcement plate 338 is in the operation condition and the non-operation condition respectively. The first notch 29A and the second notch 29B are separated by a distance equal to the shifting range of the reinforcement plate 338 in the elongated slot 332. FIG. 24 shows the reinforcement plate 338 shifted to the non-operation condition, wherein the holding protrusion 28 is engaged in the first notch 29A.

It should be noted that because the two slots 37 run parallel to each other, linear movement of the guide pin 35 is maintained so that the reinforcement plate 338 travels linearly without going askew even greater force is applied to one knob 27 than to the other.

As described in the second embodiment, when the reinforcement plate 338 is shifted away from the keys, a gap G is opened between opposing edges of the holder member 304 and the reinforcement plate 338. Opposing edges of the holder member 304 and the reinforcement plate 338 are formed with meshable protrusions and recesses. The meshing protrusions and recesses, along with the reinforcement plate 338 itself, prevent the circuit board 6 from bending and protruding through the gap G. In the present embodiment, the reinforcement plate is formed with protrusions 338A and the opposing edge of the holder member 304 is formed with recesses 304A at positions corresponding to the protrusions 338A. However, the reinforcement plate 304 could be formed with recesses and the holder member 304 formed with protrusions instead.

While the invention has been described in detail with reference to specific embodiments thereof, it would be apparent to those skilled in the art that various changes and modifications may be made therein without departing from the spirit of the invention, the scope of which is defined by the attached claims.

For example, the partial gear 31 of the first and second embodiments could be replaced with a sector gear.

Also, the mobile electrode 25 and the fixed electrodes 26 are brought into contact with each other when the key cap 2 is pressed. However, it is apparent that the same effect can be obtained by disposing a so-called membrane switch comprising two switching sheets and a spacer interposed therebetween on the lower surface of the holder member 4, 104, 204, 304 and forming a press portion on the inner upper wall of the dome portion 5A.

Instead of providing the protrusions 104A to the holder member 104 and the recess 138A to the reinforcement plate 138, the recess 138A could be provided to the holder member 104 and the protrusions 104A to the reinforcement plate 138. Also, the structure described in the second embodiment for preventing the circuit board from bending could be provided to any of the structures described in the other embodiments.

What is claimed is:
1. A data processing device comprising:
 a keyboard with a key;
 a lid provided to an edge of the keyboard so as to be pivotable from a closed position, to a predetermined intermediate angle, and further to an open position;
 a key support mechanism movable between a first position for supporting the key in an operation condition in which switching actuation is enabled upon depression of the support mechanism and a second position in which switching actuation is disabled wherein the key is not supported for operation;
 follower means in connection with said key support mechanism so that said follower means and said key support mechanism move in association; and
 drive means connected with said lid so as to operate in association with pivotal movement of said lid, said drive means driving said follower means only when said lid is pivoted between the closed position and the predetermined intermediate angle so that said key support mechanism moves from the second position into the first position when said lid is pivoted open from the closed position to the predetermined angle and said key support mechanism remains in the first position when said lid is pivoted open from the predetermined angle and greater.

2. A data processing device as claimed in claim 1 wherein a gap is opened between opposing edges of the rack member and the holder member, the gap allowing the rack member to move between the first position and the second position, edges of the rack member and the holder member confronting the gap formed with meshable protrusions and recesses.

3. A data processing device as claimed in claim 1 wherein said drive means includes a member extending from one end of said keyboard to another end in a lengthwise direction of the keyboard.

4. A data processing device as claimed in claim 1 wherein:
 said lid further includes a shaft by which said lid is pivotably provided to the edge of the keyboard and said key support mechanism further includes a sliding member slidably supported on a plate-shaped member;
 said follower means includes a rack member with a rack, the sliding member and the rack member in connection with each other so as to move in association between the first position and the second position; and
 said drive means includes a partial gear rotating in association with pivoting movement of the shaft and engaged with the rack when the lid is between the closed position and the predetermined angle and disengaged with the rack when the lid is opened to or greater than the predetermined angle.

5. A data processing device as claimed in claim 4 further comprising a holder member formed with a slot in which the rack member is disposed, a gap opened between opposing edges of the rack member and the holder member, the gap allowing the rack member to move between the first position and the second position, edges of the rack member and the holder member facing the gap formed with meshable protrusions and recesses.

6. A data processing device as claimed in claim 1 further comprising an urging means connected with said follower means and wherein said follower means disengages from said drive means when said lid is pivoted open to or greater than the predetermined angle, said urging means urging said follower means into the first position.

7. A data processing device as claimed in claim 6 wherein said key support mechanism further includes a sliding member slidably supported on a plate-shaped member; wherein said follower means includes:
   a reinforcement member in connection with the sliding member so as to move in association with the sliding member between the first position and the second position; and
   a slide member connected with the reinforcement member and formed with a recess; and
   wherein said drive means includes a pawl protruding from the lid, the pawl pivoting in association with pivoting movement of the lid and, when the lid is pivoted between the closed condition and the predetermined angle, engaging with the recess so as to slide the slide member.

8. A data processing device as claimed in claim 6 wherein said urging means includes at least two urging units provided at opposite ends of said keyboard in a lengthwise direction thereof.

9. A data processing device as claimed in claim 8 further comprising a plurality of other urging means provided between the at least two urging units.

10. A data processing device as claimed in claim 7 further comprising a holder member formed with a slot in which the reinforcement member is disposed, a gap opened between opposing edges of the reinforcement member and the holder member, the gap allowing the reinforcement member to move between the first position and the second position, opposing edges of the reinforcement member and the holder member formed with meshable protrusions and recesses.

11. A data processing device as claimed in claim 7 wherein the urging means is provided between the slide member and the reinforcement member for connecting the slide member and the reinforcement member.

12. A data processing device as claimed in claim 11 further comprising a holder member formed with a slot in which the reinforcement member is disposed, a gap opened between opposing edges of the reinforcement member and the holder member, the gap allowing the reinforcement member to move between the first position and the second position, opposing edges of the reinforcement member and the holder member formed with meshable protrusions and recesses.

13. A keyboard comprising:
   a key;
   a key support mechanism supporting said key for upward and downward movement for switching actuation in an operation condition wherein switching is enabled when in a first position and in a non-operation condition wherein switching is disabled when in a second position;
   a sliding member connected to said key support mechanism so that said sliding member and said key support mechanism move in association between the first position and the second position;
   a holder member formed with an elongated slot of predetermined size;
   a shifting member formed smaller than the elongated slot and disposed in the elongated slot so as to be shiftable in the elongated slot, said shifting member provided in connection with said sliding member so that shifting of said shifting member moves said sliding member between the first position in which said key is operable and the second position in which said key is inoperable; and
   an operation member connected to the shifting member, wherein operation of the operation member shifts said shifting member in the elongated slot.

14. A keyboard as claimed in claim 13 wherein said shifting member includes a member provided in the elongated slot so as to extend from one end of the keyboard to another end in a lengthwise direction of the keyboard.

15. A keyboard as claimed in claim 13 wherein said holder member is formed with a recess drawn away from the elongated slot and wherein said shifting member is formed with a protrusion extending toward the recess of said holder member.

16. A keyboard as claimed in claim 15 wherein said holder member is formed with a first notch and a second notch drawn away from the elongated slot and wherein said shifting member is formed with a holding protrusion, the holding protrusion engaging in the first notch while said key support mechanism is in the first position and engaging in the second notch while said key support mechanism is in the second position.

17. A keyboard as claimed in claim 15 wherein:
   said key has a key cap;
   said key support mechanism supports and guides vertical movement of the key cap and is attached to said holder member;
   said sliding member includes a flexible circuit board slidably disposed beneath said holder member and formed with a predetermined circuit pattern including a fixed electrode at a position corresponding to the key support mechanism; and
   said shifting member is provided in connection with said flexible circuit board so that shifting of said shifting member slides said flexible circuit board over said support member
   and further comprising:
   a support member supporting said flexible circuit board; and
   a switching member disposed on said circuit board at a position in correspondence with the fixed electrode, said switching member movable with sliding movements of said circuit board between a second position wherein said switching member is shifted aside from said guide support member and a first position wherein said switching member supports said guide support member and wherein depressing the key top lowers said switching member to connect a circuit with the fixed electrode.

18. A keyboard as claimed in claim 17 wherein said holder member is formed with a recess drawn away from the elongated slot and wherein said shifting member is formed with a protrusion extending toward the recess of said holder member.

19. A data processing device comprising:
   a keyboard with a key having a key cap;

a support shaft provided on one edge of said keyboard;

a lid provided with a display and pivotable on said support shaft from a closed position, to a predetermined angle, and further to an open position;

a guide support member supporting and guiding vertical movement of the key cap;

a holder member to which said guide support member is attached;

a circuit board slidably disposed beneath said holder member and formed with a predetermined circuit pattern including a fixed electrode at a position corresponding to said guide support;

a switching member disposed on said circuit board at a position in correspondence with the fixed electrode, said switching member movable with sliding movements of said circuit board between a second position, wherein said switching member is shifted aside from said guide support member, and a first position, wherein said switching member supports said guide support member and depressing the key top lowers said switching member to connect a circuit with the fixed electrode;

a support member supporting said circuit board;

follower means in connection with said circuit board so that said follower means and said circuit board slide in association;

drive means connected with said lid so as to operate in association with pivotal movement of said lid, said drive means driving movement of said follower means only while said lid is between the closed position and the predetermined angle, said drive means engaging said follower means while said lid is between the closed position and the predetermined angle so that when said lid is pivoted open from the closed position to the predetermined angle, said circuit board slides over said support member in a predetermined direction, thereby shifting said switching member from the second position to the first position, said drive means and said follower means falling out of engagement when said lid is pivoted open to or greater than the predetermined angle; and an urging means connected with said follower means and for maintaining said switching means in the first position when said lid is pivoted open to or greater than the predetermined angle.

20. A data processing device as claimed in claim 19 wherein a gap for allowing said switching member to move between the first position and the second position is provided between opposing edges of the reinforcement member and the said holder member, the opposing edges being formed with a meshable protrusion and recess.

21. A data processing device as claimed in claim 19 wherein said drive means includes a member extending from one end of said keyboard to another in a lengthwise direction of the keyboard.

22. A data processing device as claimed in claim 19 wherein said follower means includes a reinforcement member fixed to said circuit board, the reinforcement member having a rack formed on one surface thereof and wherein said drive means includes a partial gear engaged with the rack when the lid is between the closed position and the predetermined angle.

23. A data processing device as claimed in claim 22 wherein a gap for allowing said switching member to move between the first position and the second position is provided between opposing edges of the reinforcement member and the said holder member, the opposing edges being formed with a meshable protrusion and recess.

24. A data processing device as claimed in claim 19 wherein:

said follower means includes:
a reinforcement member fixed to said circuit board; and
a slide member connected with the reinforcement member and formed with a recess; and wherein
said drive means includes a pawl protruding from the lid, the pawl pivoting in association with the lid and, when the lid is pivoted between the closed condition and the predetermined angle, engaging with the recess so as to slide the slide member.

25. A data processing device as claimed in claim 24 wherein a gap for allowing said switching member to move between the first position and the second position is provided between opposing edges of the reinforcement member and the said holder member, the opposing edges being formed with a meshable protrusion and recess.

26. A data processing device as claimed in claim 24 wherein the urging means is provided between the slide member and the reinforcement member for connecting the slide member and the reinforcement member.

* * * * *